(12) United States Patent
Lim

(10) Patent No.: US 9,737,091 B2
(45) Date of Patent: Aug. 22, 2017

(54) PLASMA STERILIZATION FILM AND PLASMA STERILIZATION WRAPPING CONTAINER

(71) Applicant: PLASMAPP CO., LTD., Daejeon (KR)

(72) Inventor: Youbong Lim, Daejeon (KR)

(73) Assignee: PLASMAPP CO., LTD., Daejeon (KR)

( * ) Notice: Subject to any disclaimer, the term of this patent is extended or adjusted under 35 U.S.C. 154(b) by 0 days.

(21) Appl. No.: 15/434,952

(22) Filed: Feb. 16, 2017

(65) Prior Publication Data

US 2017/0156379 A1 Jun. 8, 2017

Related U.S. Application Data

(63) Continuation of application No. PCT/KR2015/008551, filed on Aug. 17, 2015.

(30) Foreign Application Priority Data

Aug. 18, 2014 (KR) ........................ 10-2014-0106732

(51) Int. Cl.
*A23L 3/32* (2006.01)
*B32B 15/08* (2006.01)
(Continued)

(52) U.S. Cl.
CPC ................ *A23L 3/32* (2013.01); *B32B 15/08* (2013.01); *B32B 15/20* (2013.01); *B32B 27/06* (2013.01);
(Continued)

(58) Field of Classification Search
CPC A23L 3/32; B32B 15/08; B32B 27/06; B32B 27/322; B32B 15/20; B32B 27/36;
(Continued)

(56) References Cited

U.S. PATENT DOCUMENTS

2003/0108460 A1 6/2003 Andreev et al.

FOREIGN PATENT DOCUMENTS

JP 2008183025 A 8/2008
KR 10-2010-0082614 A 7/2010
(Continued)

OTHER PUBLICATIONS

Korean Search Report for Application No. PCT/KR2015/008551 dated Oct. 28, 2015.

*Primary Examiner* — Michael C Miggins
(74) *Attorney, Agent, or Firm* — Jenkins, Wilson, Taylor & Hunt P.A.

(57) ABSTRACT

A sterilization film is configured to generate atmospheric pressure plasma. The sterilization film includes a flexible dielectric barrier film, upper and lower electrode layers, which are respectively provided on top and bottom surfaces of the dielectric barrier film, and a lower protection layer, which encloses an exposed surface of the lower electrode layer and is formed of a dielectric material. The upper electrode layer includes a thin-plate shaped upper electrode and an upper pad, which is electrically connected to the upper electrode to provide an electrical connection path to an outside. The lower electrode layer includes a lower electrode, which is provided in a porous screen structure with through holes, and a lower pad providing an electrical connection path to the lower electrode. The upper and lower pads are electrically connected to an external power and are used to generate plasma near the porous screen structure.

19 Claims, 20 Drawing Sheets

(51) Int. Cl.
*B32B 27/06* (2006.01)
*B32B 27/32* (2006.01)
*B32B 15/20* (2006.01)
*B32B 27/36* (2006.01)

(52) U.S. Cl.
CPC ............ *B32B 27/322* (2013.01); *B32B 27/36* (2013.01); *A23V 2002/00* (2013.01); *B32B 2323/04* (2013.01); *B32B 2323/10* (2013.01); *B32B 2327/18* (2013.01); *B32B 2367/00* (2013.01)

(58) Field of Classification Search
CPC ............ B32B 2323/04; B32B 2323/10; B32B 2327/18; B32B 2367/00; A23V 2002/00
See application file for complete search history.

(56) References Cited

FOREIGN PATENT DOCUMENTS

| | | |
|---|---|---|
| KR | 10-2010-0090773 A | 8/2010 |
| KR | 10-1012442 B1 | 2/2011 |
| KR | 10-2013-0137369 A | 12/2013 |
| KR | 10-1391708 B1 | 5/2014 |

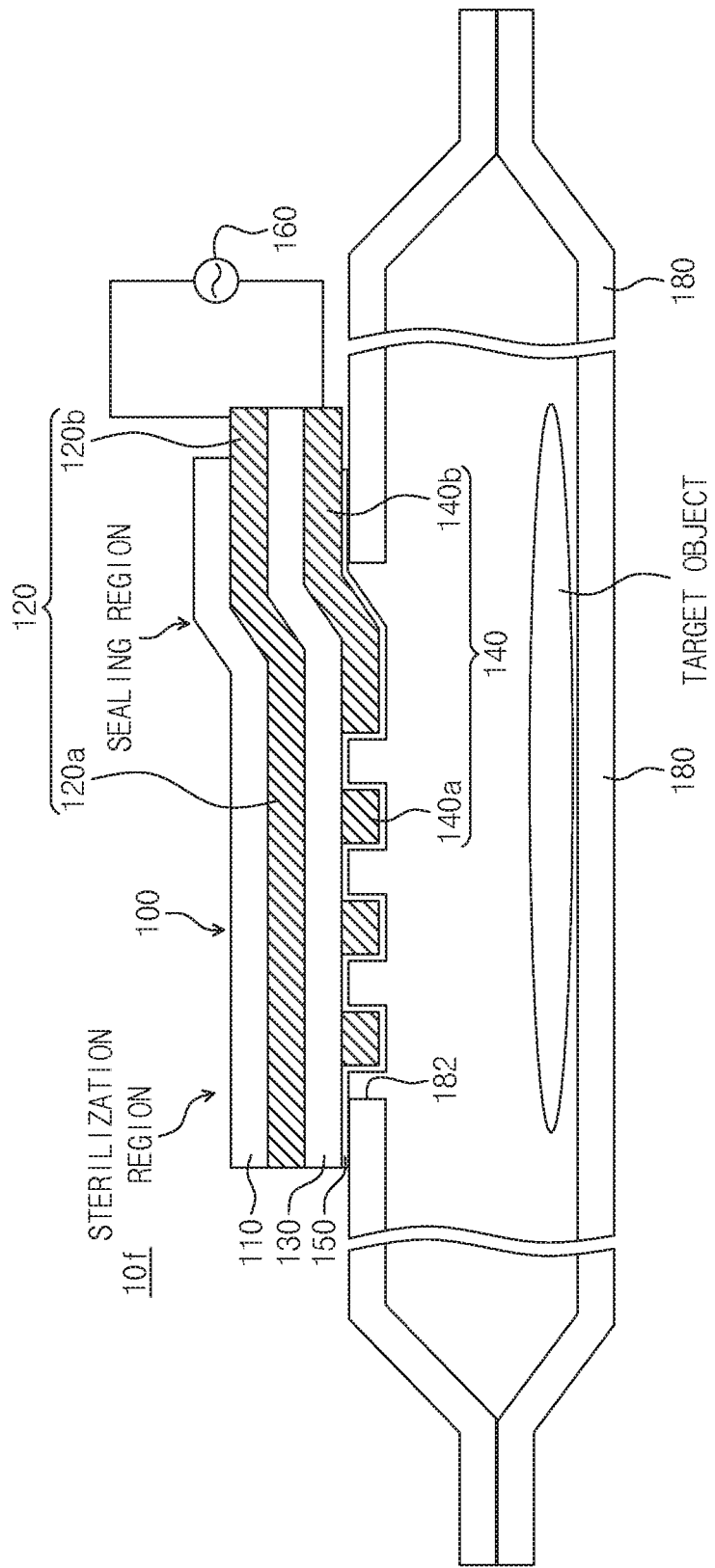

PLASMA STERILIZATION FILM AND PLASMA STERILIZATION WRAPPING CONTAINER

CROSS-REFERENCE TO RELATED APPLICATIONS

This application is a continuation of and claims priority to PCT/KR2015/008551 filed on Aug. 17, 2015, which claims priority to Korea Patent Application No. 10-2014-0106732 filed on Aug. 18, 2014, the entireties of which are both incorporated by reference herein.

BACKGROUND

The present disclosure relates to a sterilization film capable of generating plasma, and in particular, to a wrapping structure, which includes an upper protection layer, an upper electrode, a dielectric barrier film, a lower electrode, and a lower protection layer and is configured to have a similar structure to a retort pouch and generate atmospheric pressure plasma for sterilization.

Japanese Patent Laid-open No. 2008-183025 discloses a plasma sterilization apparatus configured to use an air-permeable wrapping material and to generate a dielectric barrier discharge. Microorganisms in the sterilization apparatus may be killed by oxygen radicals, which are directly generated by the dielectric barrier discharge, or by ozone, OH radical, or hydrogen peroxide, which is generated by the ultraviolet light emitted from the plasma. However, it is difficult to apply the method disclosed in Japanese Patent Laid-open No. 2008-183025 to a liquid target object.

In addition, Korean Patent No. 10-1012442 discloses a plasma sterilization apparatus using atmospheric pressure plasma. However, it is difficult to apply the method disclosed in Korean Patent No. 10-1012442 to a wrapping structure and/or a liquid target object.

Some goods (e.g., food, beverages, and so forth) are individually packaged and delivered to consumers, in order to increase the value of the goods and to protect the goods in the distribution process. Generally, paper, glass, plastic, and so forth may be used as a material for a wrapping container. Especially, in the case of dry foods, plastic packaging containers (e.g., of polyethylene terephthalate (PET)) are used to prevent moisture absorption, discoloration, fat acidification, and flavor deterioration, and an aluminum foil with low moisture and oxygen permeability and good barrier properties is additionally used, in addition to the PET film.

In addition, a gas replacement packaging method has been developed as an improvement measure for a vacuum packaging method. By applying such a gas replacement packaging method, it is possible to reduce the growth rate of microorganisms, delay the deterioration by enzymes, and maintain the color of meat.

However, it is hard to completely prevent growth of microorganisms, even if food is packaged. In addition, in order to sterilize a food product, a sterilization process should be performed before a packaging process, if a high-pressure high-temperature sterilization using a retort pouch is not used. Accordingly, there may be a re-contamination or cross-contamination issue during storage of the food product.

A thermal sterilization process on a retort pouch is considered to be effective and safe, but the thermal sterilization process may lead to physicochemical changes of food such as destruction of nutrients and a change in flavor of the food. In addition, it is hard to apply the thermal sterilization to heat-sensitive food product.

Recently, non-thermal sterilization methods have been developed and commercialized to overcome the disadvantages of the thermal sterilization. For instance, a method using ultraviolet (UV) light, radioactive ray (e.g., gamma ray, electron beam, X-ray), and ultra-high pressure may be used as examples of the non-thermal sterilization method. The ultraviolet light may not be suitable for sterilizing a packaged food product, due to its low permeability. By contrast, the radioactive ray has high permeability, and thus, it can be used to sterilize a fully-packaged food product. However, the radioactive ray sterilization is slowly being commercialized, owing to its enormous initial installation and management costs and low acceptability of consumers. The method using the ultra-high pressure can be used to sterilize a fully-packaged food product, but this method also has a problem of high initial investment cost and physicochemical change of food.

Low-temperature atmospheric-pressure plasma is the solution that is proposed as an alternative to the non-thermal sterilization technology of the packaged food products. A sterilization method using plasma provides great advantages in cost efficiency, mobility and workability, compared to other non-thermal sterilization methods. However, since the low-temperature atmospheric-pressure plasma has low permeability, it is difficult to sterilize a food product in a package using the plasma generated from the outside. If the plasma is generated in the package, a fully packaged food product may be effectively sterilized by the plasma.

A dielectric barrier discharge (DBD) has been proposed as one of conventional methods, and during the DBD, an external electrode is used to apply a voltage using helium or argon gas. In this case, an additional electrode structure is required in addition to the wrapping structure, and moreover, there is a difficulty in sterilizing a curved or thick food product. Reactive nitrogen species (RNS) and reactive oxygen species (ROS) in plasma of nitrogen or oxygen gas provide a better sterilization effect, when compared to the case that atmospheric plasma of helium gas is used. However, under the condition of the atmospheric pressure, a plasma discharge breakdown voltage of nitrogen or oxygen gas is higher than that of helium gas, and thus there is a problem in generating plasma from nitrogen or oxygen gas. In addition, if the wrapping structure does not have a flat shape, it is difficult to generate plasma and to achieve a uniform sterilization effect.

Therefore, it is necessary to develop a plasma generation device using the wrapping container itself. Furthermore, it is necessary to develop a technique for generating atmospheric pressure plasma from nitrogen gas or the air, which is mainly used for food packaging, and for utilizing the plasma for the food sterilization.

Retort pouches are used to wrap a liquid target object, but in certain cases, it is necessary to use a structure capable of selectively performing one of the plasma sterilization and the thermal sterilization on the retort pouches.

Accordingly, inventors of the present patent application have repeatedly studied to develop a technology useful for inhibiting the growth of microorganisms, which may occur during a distribution process, without damage of the wrapping structure and for sterilizing a wrapping structure itself. A wrapping structure proposed by the inventors is configured to allow any of factory operators (e.g., after the wrapping process), retailers, and consumers to perform a sterilization process using atmospheric pressure plasma, before opening the wrapping structure, if a simple power supply is provided.

SUMMARY

Some embodiments provide a sterilization film, which is used as a wrapping structure itself and is operated as a plasma generation part. Accordingly, it is possible to perform a self-sterilization on the wrapping structure without necessity for an additional device. In certain embodiments, the wrapping structure may be configured to further perform a thermal sterilization process, which has been used for a conventional retort pouch, if necessary.

According to some embodiments, a sterilization film may be configured to generate atmospheric pressure plasma. The sterilization film may include a dielectric barrier film having a flexible property, an upper electrode layer provided on a top surface of the dielectric barrier film, the upper electrode layer including an upper electrode, which is provided in a thin-plate shape, and an upper pad, which is electrically connected to the upper electrode and is used to provide an electrical connection path to an outside, a lower electrode layer provided on a bottom surface of the dielectric barrier film, the lower electrode layer including a lower electrode, which is provided in a porous screen structure including a plurality of through holes, and a lower pad, which is used to provide an electrical connection path to the lower electrode, and a lower protection layer provided to enclose an exposed surface of the lower electrode layer and formed of a dielectric material. The upper pad and the lower pad may be electrically connected to an external power and may be used to generate plasma near the porous screen structure.

In some embodiments, the sterilization film may further include an upper protection layer provided on the upper electrode layer.

In some embodiments, the lower protection layer may be provided to cover only bottom and side surfaces of the through hole of the porous screen structure.

In some embodiments, the dielectric barrier film may include at least one of polytetrafluoroethylene (PTFE), polyethylene, polypropylene, polystyrene, or polyester.

In some embodiments, the upper electrode layer and the lower electrode layer may include copper or aluminum.

In some embodiments, the upper protection layer may include polyether, and the lower protection layer may include polypropylene.

In some embodiments, the sterilization film may further include a first coupling element, which is provided near the porous screen structure and is coupled to a second coupling element provided near an opening of a sealing container to coupling element seal the sealing container.

In some embodiments, the first coupling element may be a part of a zipper lock.

In some embodiments, the through hole of the porous screen structure may have a diameter ranging from 0.3 mm to 3 mm.

In some embodiments, the porous screen structure may include at least one letter-shaped portion.

In some embodiments, the upper pad and the lower pad may be spaced apart from each other in such a way that the upper and lower pads are prevented from facing each other.

In some embodiments, the sterilization film may further include an abrasion-resistance layer interposed between the upper electrode layer and the upper protection layer.

According to some embodiments, a hermetically-wrapping container may include a sterilization film. The sterilization film may include a sterilization region configured to generate plasma in the hermetically-wrapping container by using an upper electrode, a lower electrode provided in a porous screen structure, and a dielectric barrier film disposed between the upper and lower electrodes, a sealing region provided around the sterilization region and used to contain a target object, and a pad region including upper and lower pads which are electrically and respectively connected to the upper and lower electrodes.

In some embodiments, the sterilization region of the sterilization film may include a dielectric barrier film having a flexible property, the upper electrode provided on a top surface of the dielectric barrier film and in a thin-plate shape, the lower electrode provided on a bottom surface of the dielectric barrier film and in porous screen structure with a plurality of through holes, an upper protection layer provided on a top surface of the upper electrode, and a lower protection layer provided on a bottom surface of the lower electrode.

In some embodiments, the upper and lower pads may be provided in such a way that the upper and lower pads are prevented from facing each other.

In some embodiments, the sealing region of the sterilization film may include a dielectric barrier film having a flexible property, the upper electrode provided on a top surface of the dielectric barrier film and in a thin-plate shape, an upper protection layer provided on a top surface of the upper electrode, and a lower protection layer provided on a bottom surface of the lower electrode.

In some embodiments, the dielectric barrier film may include at least one of polytetrafluoroethylene (PTFE), polyethylene, polypropylene, polystyrene, or polyester.

In some embodiments, the upper electrode and the lower electrode may include copper or aluminum.

In some embodiments, the upper protection layer may include polyether, and the lower protection layer may include polypropylene.

According to some embodiments, a wrapping container may be configured to hermetically seal a target object using a wrapping film including a sterilization film. The sterilization film may include an upper electrode shaped like a plate, an upper protection layer provided on the upper electrode, a lower electrode provided under the upper electrode and in a porous screen structure, a lower protection layer provided under the lower electrode, and a dielectric barrier film provided between the upper and lower electrodes.

According to some embodiments, a wrapping container may be configured to hermetically seal a target object using a wrapping film. The wrapping container may include a wrapping film including an opening and enclosing the target object and a sterilization film provided to cover the opening of the wrapping film and configured to generate plasma. The sterilization film may include an upper electrode shaped like a plate, an upper protection layer provided on the upper electrode, a lower electrode provided under the upper electrode and in a porous screen structure, a lower protection layer provided under the lower electrode, and a dielectric barrier film provided between the upper and lower electrodes.

In some embodiments, the wrapping film may be coupled to the sterilization film through a thermocompression bonding or using an adhesive layer.

In some embodiments, the wrapping container may further include a zipper lock provided around a passage, through which the target object enters or exits.

In some embodiments, the wrapping film may include at least one of polyethylene, polypropylene, polystyrene, polyvinyl, or polyester.

In some embodiments, the wrapping film may have substantially the same structure as the sterilization film.

In some embodiments, the upper electrode and the lower electrode may include copper or aluminum.

In some embodiments, the dielectric barrier film may include at least one of polytetrafluoroethylene (PTFE), polyethylene, polypropylene, polystyrene, or polyester.

In some embodiments, the upper protection layer may include polyether, and the lower protection layer may include polypropylene.

In some embodiments, the wrapping film and the sterilization film may be coupled to each other using a zipper lock.

According to some embodiments, a wrapping container may be configured to hermetically seal a target object using a wrapping film. The wrapping container may include a wrapping film configured to provide a sealed internal space hermetically enclosing the target object and a sterilization film including a sterilization region and a pad region. The sterilization region may be provided in the sealed internal space and may be used to generate plasma, and the pad region may be provided outside the sealed internal space.

In some embodiments, the sterilization film may include an upper electrode shaped like a plate, an upper protection layer provided on the upper electrode, a lower electrode provided under the upper electrode and in a porous screen structure, a lower protection layer provided under the lower electrode, and a dielectric barrier film provided between the upper and lower electrodes.

According to some embodiments, a storage container include a main storage container configured to include an opening and to contain a target object and a sterilization film provided to cover the opening of the main storage container and configured to generate plasma.

In some embodiments, the sterilization film may include an upper electrode shaped like a plate, an upper protection layer provided on the upper electrode, a lower electrode provided under the upper electrode and in a porous screen structure, a lower protection layer provided under the lower electrode, and a dielectric barrier film provided between the upper and lower electrodes.

According to some embodiments, a storage container may be configured to hermetically seal a target object. The storage container may include a body portion providing an internal space for storing the target object and including an opening, a lid portion provided near the opening of the body portion and including a through hole formed at a center region thereof, and a sterilization film provided near the through hole of the lid portion and configured to generate plasma. The body portion may be formed of at least one of glass or plastic materials, and the lid portion may be formed of at least one of plastic materials. The sterilization film may include an upper electrode provided in the storage container and connected to an external power, a lower electrode provided in a porous screen structure, and a dielectric barrier film provided between the upper and lower electrodes.

In some embodiments, the lid portion may include a lock handle coupled to each side portion of the lid portion, and the lock handle may be coupled to a protrusion, which is provided along an outer top sidewall of the body portion and near the opening, in an insertion manner.

In some embodiments, the sterilization film may be coupled to a top surface of the lid portion using a zipper lock or an adhesive layer.

In some embodiments, the storage container may further include an auxiliary lid portion, which is provided on the through hole of the lid portion and is formed of at least one of plastic materials, and the sterilization film may be provided on a bottom surface of the auxiliary lid portion.

According to some embodiments, a sterilization film include a sterilization region, which is configured to generate plasma in a hermetically-wrapping container by using an upper electrode, a lower electrode provided in a porous screen structure, and a dielectric barrier film disposed between the upper and lower electrodes, and a pad region including upper and lower pads, which are electrically and respectively connected to the upper and lower electrodes.

In some embodiments, the sterilization region may include a dielectric barrier film having a flexible property, the upper electrode provided on a top surface of the dielectric barrier film and in a thin-plate shape, the lower electrode provided on a bottom surface of the dielectric barrier film and in porous screen structure with a plurality of through holes, an upper protection layer provided on a top surface of the upper electrode, and a lower protection layer provided on a bottom surface of the lower electrode.

According to some embodiments, a method of sterilizing a hermetically-wrapping container including a sterilization film is disclosed. The sterilization film may include a lower protection layer, a lower electrode, a dielectric barrier film, an upper electrode, an upper protection layer, which are sequentially stacked. The method may include disposing a wrapping target into the hermetically-wrapping container through an entrance of the hermetically-wrapping container, sealing the entrance of the hermetically-wrapping container, and applying an AC voltage to upper and lower pads, which are exposed to an outside of the hermetically-wrapping container and are respectively connected to the upper and lower electrodes, to generate plasma in the hermetically-wrapping container and to sterilize the wrapping target.

In some embodiments, the method may further include heating the hermetically-wrapping container to a temperature ranging from 80° C. to 120° C. to thermally sterilize the wrapping target.

In some embodiments, the method may further include preliminarily sterilizing the wrapping target, before the disposing of the wrapping target into the hermetically-wrapping container through the entrance of the hermetically-wrapping container. The preliminarily sterilizing of the wrapping target may include applying an AC voltage to the upper and lower pads, which are respectively connected to the upper and lower electrodes, to generate plasma in the hermetically-wrapping container.

In some embodiments, the sealing of the entrance of the hermetically-wrapping container may include filling the hermetically-wrapping container with an oxygen-containing gas, and sealing the entrance of the hermetically-wrapping container filled with the oxygen-containing gas.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 9C is the sectional view of FIG. 9A.

Figure 1A:
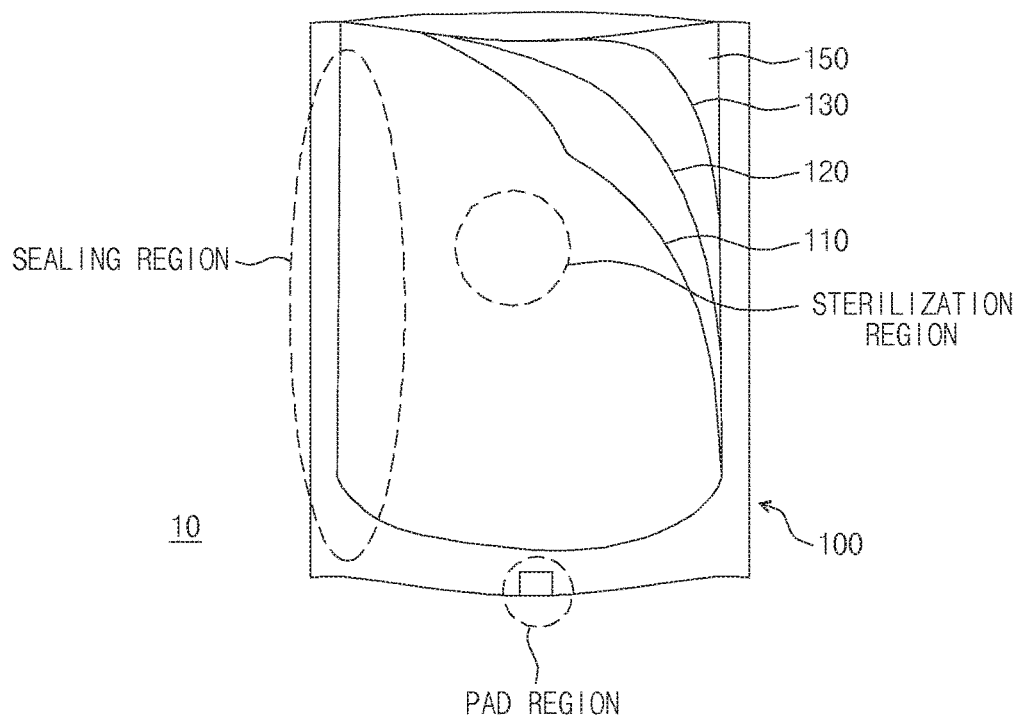
FIG. 1A is a conceptual diagram of a wrapping container according to some embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

A conventional dielectric barrier plasma source is used to apply a voltage to an electrode and thereby to generate plasma on a surface of a dielectric plate. Thus, the dielectric barrier plasma source can be used to perform a sterilization process on an object spaced apart from the dielectric plate. To wrap the object, the object is disposed in a wrapping structure, after the sterilization process.

In the case of the conventional dielectric barrier plasma source, secondary contamination may occur when the wrapping structure is moved after the plasma sterilization process. Therefore, it is important to control hygienic management on environment in which the wrapping process is performed is very important, but this leads to an increase in cost of the wrapping process. Also, there is a difficulty in controlling the environment for the wrapping process, and thus, for objects such as medical devices, an additional sterilization process is required. As a result, a total cost of the wrapping and sterilization process is increased. Furthermore, in the case where a wrapping target has a curved shape, it is difficult to uniformly sterilize the wrapping target, owing to variation in distance between a plasma source and the wrapping target.

In the conventional dielectric barrier discharge technique, a target object should be spaced apart from a plasma electrode. Furthermore, in the case where the target object contains a large amount of water, it is disadvantageous in that there is a limitation in using this technique. That is, there is a difficulty in using the conventional dielectric barrier plasma sterilization technique for a wrapping structure.

A retort pouch is a lamination film consisting of a plurality of films with different properties. For example, the retort pouch may include three or five layers, at least one of which is provided in the form of a plastic film or an aluminum foil, and which are bonded to each other. The use of such a lamination film may make it possible to improve heat resistance, gas permeability, and thermal adhesion properties of the retort pouch.

A plasma sterilization film according to some embodiments may be integrated as a part of a conventional retort pouch. The conventional retort pouch may include an inner layer (e.g., polypropylene), a middle layer (e.g., aluminum), and an outer layer (e.g., polyester). The layers of the retort pouch may be bonded to each other by adhesive layers. Meanwhile, the plasma sterilization film may include a lower protection layer, a lower electrode, a dielectric barrier film, an upper electrode, an upper protection layer, which are sequentially stacked. In order to realize a dielectric barrier discharge, a dielectric barrier film may be interposed between an upper electrode shaped like a plate and a lower electrode having a porous screen shape. Thus, in order to perform a dielectric barrier discharge in the retort pouch, it is necessary to change a structure of the retort pouch. For example, in the case where the middle layer (e.g., aluminum) of the retort pouch is used as an upper electrode for the dielectric barrier discharge and the inner layer (e.g., polypropylene) of the retort pouch is used as a dielectric barrier film for the dielectric barrier discharge, an additional lower electrode is required. In the case where the additional lower electrode is exposed to a liquid material, the lower electrodes with the porous screen shape may be electrically connected to each other and this may lead to an unstable discharge. To prevent the lower electrode from being in direct contact with the target object, the lower electrode may be covered with the lower protection layer. In this case, the lower protection layer may be used as a layer in contact with food and may be formed of polypropylene or polyethylene. In a structure of the retort pouch, the outer layer may be formed of a polyethylene layer serving as a protection layer, and may be provided on an upper electrode of the plasma sterilization film, thereby serving as an upper protection layer. As a result, if, in the structure of the retort pouch, the lower electrode and the lower protection layer are added, a plasma sterilization film may be provided. In the case where the plasma sterilization film is used as a wrapping container, a plasma discharge may be stably performed to sterilize an inner space of the wrapping container or the retort pouch.

The plasma sterilization film itself may be used as a portion, or the entirety, of the wrapping container. In addition, the plasma sterilization film may be bonded to a conventional wrapping container and may be used to perform a plasma sterilization process. In the case where the plasma sterilization film is used for a retort pouch, the retort pouch may be used to perform one or both of plasma and thermal sterilization operations.

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1A is a conceptual diagram of a wrapping container according to some embodiments.

Figure 1B:
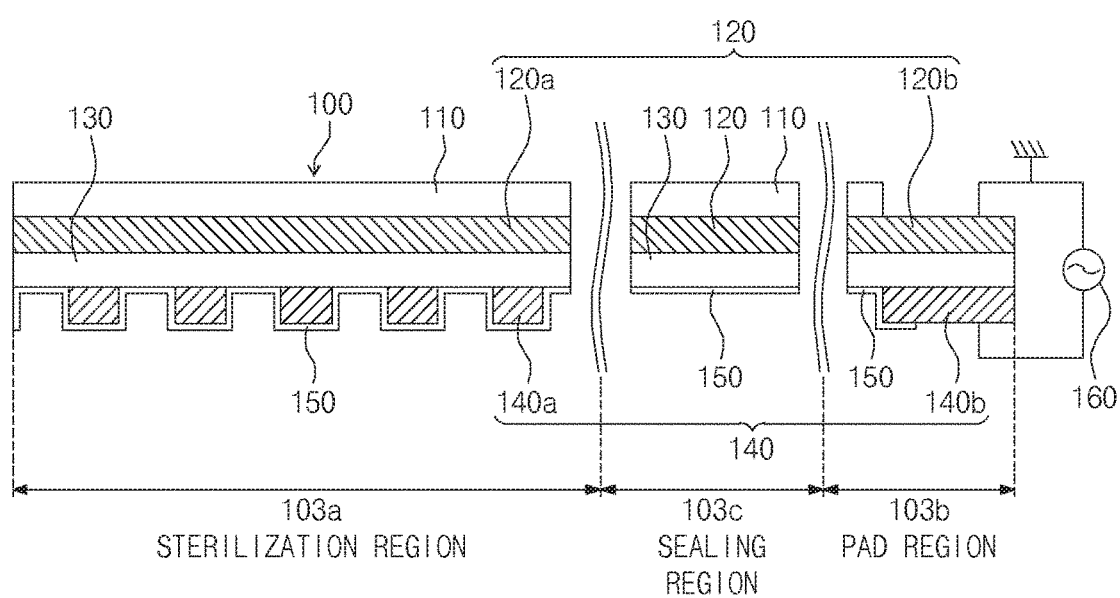
FIG. 1B is a sectional view illustrating cross-sections of some regions of the wrapping sterilization film of FIG. 1A.

FIG. 1B is a sectional view illustrating cross-sections of some regions of the wrapping sterilization film of FIG. 1A.

Figure 1C:
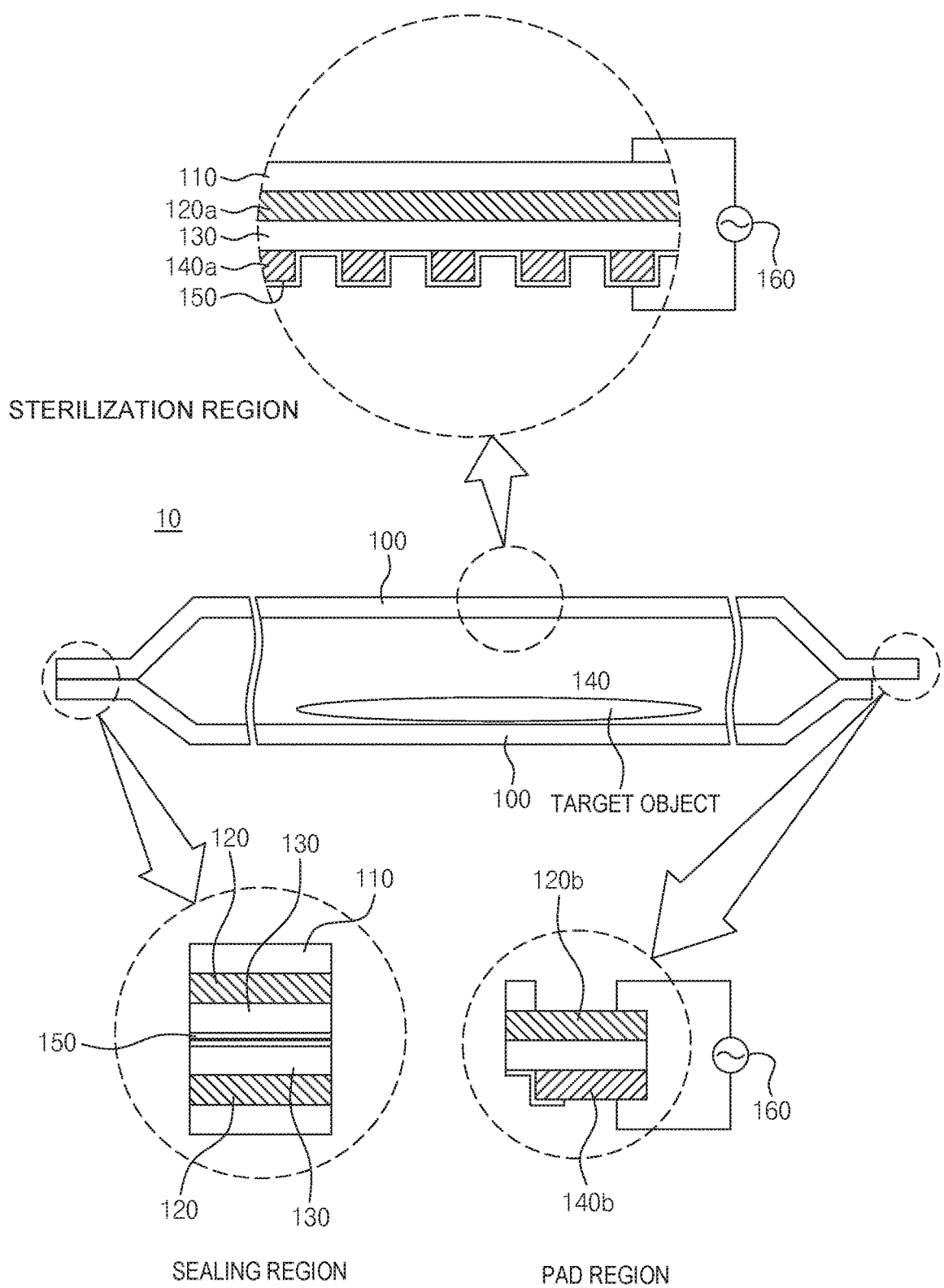
FIG. 1C is a diagram illustrating cross-sections of FIG. 1A.

FIG. 1C is a diagram illustrating cross-sections of FIG. 1A.

Figure 2:
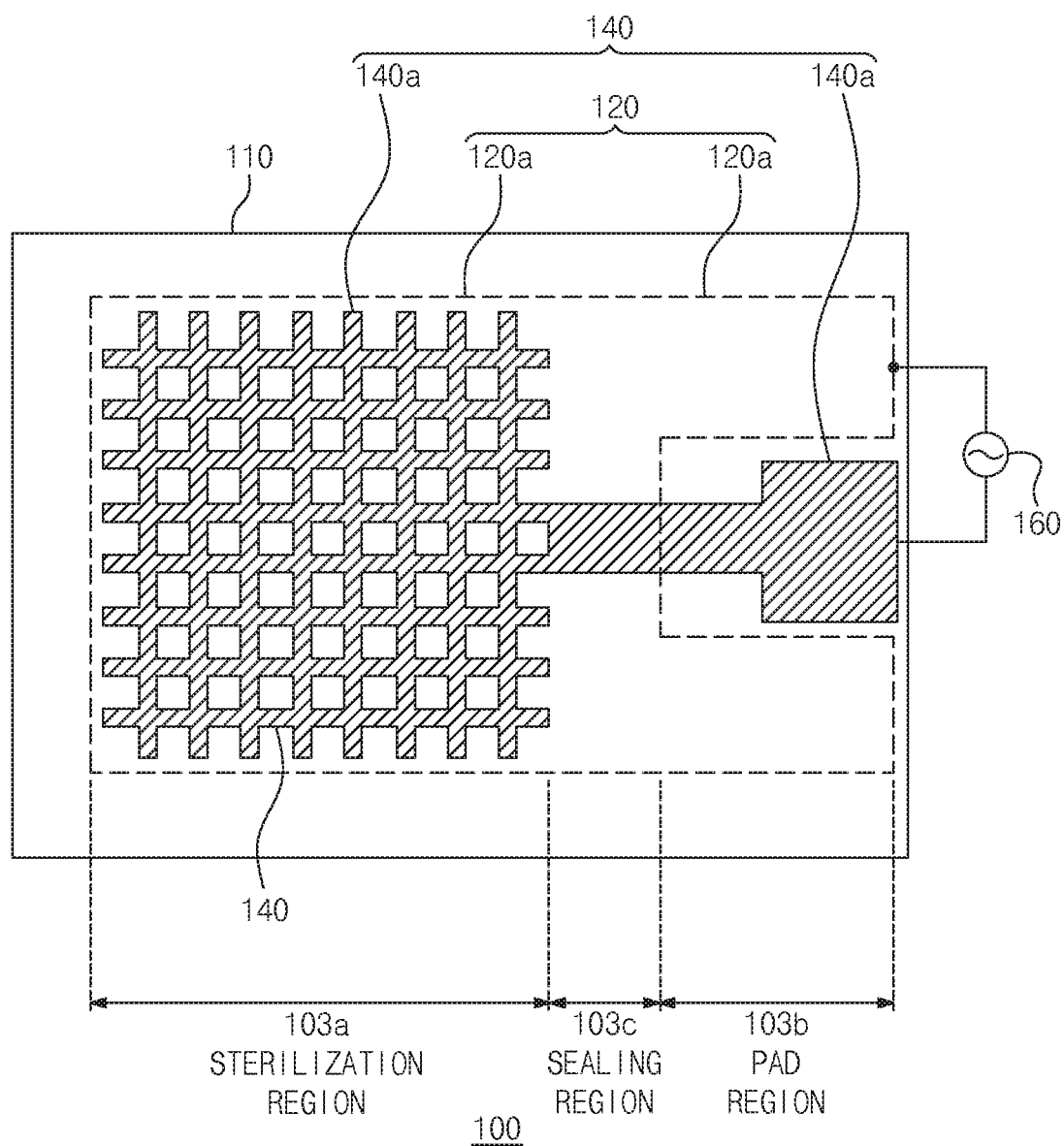
FIG. 2 is a plan view of the sterilization film of FIG. 1A.

FIG. 2 is a plan view of the sterilization film of FIG. 1A.

Referring to FIGS. 1A, 1B, 1C, and 2, a wrapping container 10 may include a sterilization film 100. The sterilization film 100 may include a sterilization region 103a, a sealing region 103c, and a pad region 103b. Also, the sterilization film 100 may include an upper electrode 120a, a lower electrode 140a of a porous screen structure, and a dielectric barrier film 130 provided between the upper and lower electrodes 120a and 140a, and the upper electrode 120a, the lower electrode 140a, and the dielectric barrier film 130 may be used to generate plasma in the sterilization region 103a in the hermetically-wrapping container 10. The sealing region 103c may be provided around the sterilization region 103a, and a target object may be contained in the sealing region 103c. The pad region 103b may include an upper pad 120b, which is electrically connected to the upper electrode 120a, and a lower pad 140b, which is electrically connected to the lower electrode 140a. One surface of each of the upper pad 120b and the lower pad 140b may be exposed to the atmosphere.

The sterilization region 103a, the sealing region 103c, and the pad region 103b may be continuously connected to each other along the dielectric barrier film 130. The pad region 103b may have a similar structure to the sterilization region 103a, but in the pad region 103b, an upper electrode layer 120 may be provided to have the upper pad 120b with an exposed surface and a lower electrode layer 140 may be provided to have the lower pad 140b with an exposed surface. The sealing region 103c may have a similar structure to the sterilization region 103a, but the lower electrode 140a or the lower pad 140b may not be provided in the sealing region 103c.

The sterilization region 103a may be configured to generate plasma in the wrapping container 10 through a dielectric barrier discharge and to sterilize an inner space of the wrapping container 10. The sterilization region 103a of the sterilization film 100 may include a dielectric barrier film 130 with a flexible property, the upper electrode 120a, which is provided on a top surface of the dielectric barrier film 130 and has a thin-plate shape, the lower electrode 140a, which is provided under a bottom surface of the dielectric barrier film 130 and has a porous screen structure with a plurality of through holes, an upper protection layer 110, which is provided on a top surface of the upper electrode 120a, and a lower protection layer 150, which is provided under a bottom surface of the lower electrode 140a.

The pad region 103b may be configured to allow for electrical connection to the outside and may be provided outside an internal space of the wrapping container 10, and in order to prevent the dielectric barrier discharge from occurring, the upper pad 120b and the lower pad 140b may not be provided to face each other. The upper pad 120*b* and the lower pad 140*b* may be connected to an external power. The lower pad 140*b* may be grounded, and a high voltage may be applied to the upper pad 120*b*. In certain embodiments, the upper pad 120*b* may be grounded, and a high voltage may be applied to the lower pad 140*b*. Thus, a user may not be exposed to a high voltage.

The sealing region 103*c* may be a region which is provided to enclose the sterilization region 103*a* and to provide a sealed space. The sealing region 103*c* of the sterilization film 100 may include a dielectric barrier film 130 with a flexible property, the upper electrode 120*a*, which is provided on a top surface of the dielectric barrier film 130 and has a thin-plate shape, the upper protection layer 110 provided on a top surface of the upper electrode 120*a*, and the lower protection layer 150 provided on a bottom surface of the lower electrode 140*a*. The sealing region 103*c* may include a portion, at which upper and lower sterilization films bonded by a thermocompression bonding are provided.

In certain embodiments, the sealing region 103*c* may not be used to generate plasma. Thus, the upper and lower electrodes 120*a* and 140*a* may be wholly removed from the sealing region 103*c*. Only one of the upper and lower electrodes 120*a* and 140*a* may be provided to prevent external light from being incident into the sealing region 103*c* of the wrapping container 10.

The dielectric barrier film 130 may include at least one of polytetrafluoroethylene (PTFE), polyethylene, polypropylene, polystyrene, or polyester. The dielectric barrier film 130 may be used for a similar purpose to that of the inner layer of the retort pouch. The dielectric barrier film 130 may serve as a substrate film, on which the upper electrode 120*a* and the lower electrode 140*a* are provided. The dielectric barrier film 130 may be formed of or include a material, which can prevent a dielectric breakdown issue when a high voltage for the dielectric barrier discharge is applied thereto. For example, a breakdown voltage of a chosen material is generally determined by a dielectric strength and a thickness thereof, and if such a breakdown voltage of a material is substantially higher than an operation voltage for atmospheric pressure plasma, the material can be used for the dielectric barrier film 130. The dielectric barrier film 130 may have a thickness ranging from several tens of micrometers to several hundreds of micrometers. Preferably, the dielectric barrier film 130 may have a thickness of about 200 micrometers. The dielectric barrier film 130 may have a flexible property and may be formed of a material which is adhesive to the upper electrode 120*a* and the lower electrode 140*a*.

The upper and lower electrodes 120*a* and 140*a* may be formed of or include copper or aluminum. In the case where the lower protection layer 150 and the dielectric barrier film 130 are damaged by the wrapping target, the wrapping target may be in direct contact with and be contaminated by the upper and lower electrodes 120*a* and 140*a*. Accordingly, the upper and lower electrodes 120*a* and 140*a* may be formed of or include a harmless material (e.g., aluminum), on which a coating process can be performed. The upper electrode 120*a* may be coated on the top surface of the dielectric barrier film 130. The upper electrode 120*a* may be formed by coating and patterning the upper electrode layer 120. For example, a portion of the upper electrode layer 120 facing the lower pad 140*b* may be removed.

The lower electrode 140*a* may be coated on a bottom surface of the dielectric barrier film 130. The lower electrode 140*a* may be formed by forming and patterning the lower electrode layer 140. The upper electrode 120*a* and the lower electrode 140*a* may be formed to have a thickness ranging from several micrometers to several hundreds of micrometers. In some embodiments, the upper electrode 120*a* and the lower electrode 140*a* may have a thickness of about 100 micrometers.

The upper electrode 120*a* may have a thin-plate shape and may be used as an electrode for the dielectric barrier discharge. Furthermore, the upper electrode 120*a* may server as a barrier layer blocking an external air or external light.

The upper pad 120*b* may be formed by partially removing the upper protection layer 110 and may be used to electrically connect the upper electrode 120*a* to an external power. The upper pad 120*b* and the upper electrode 120*a* may be provided on the dielectric barrier film 130. The upper pad 120*b* and the upper electrode 120*a* may be deposited at the same time.

The lower electrode 140*a* may have a porous screen shape and may be used to produce a strong electric field for the dielectric barrier discharge. The lower electrode 140*a* may have a plurality of holes which are arranged in a mesh or matrix shape. Each of the holes may be shaped like a circle, a polygon, a slit, or a twisty slit. Each of the holes of the porous screen may have a diameter or width of 0.3 mm to 3 mm.

The lower pad 140*b* may be electrically connected to the lower electrode 140*a* and may be designed in such a way that the upper pad 120*b* does not face the lower pad 140*b*. This may make it possible to prevent or suppress plasma from being produced near the pad. The lower pad 140*b* and the lower electrode 140*a* may be simultaneously formed on the bottom surface of the dielectric barrier film 130.

The upper protection layer 110 may be provided on the upper electrode 120*a* and may be exposed to the external atmosphere. The upper protection layer 110 may be formed to have a sufficiently high strength and thereby to provide a surface protection function. The upper protection layer 110 may be formed of or include polyether or polyethyleneterephthalate (PET). The upper protection layer 110 may have a thickness ranging from several micrometers to several tens of micrometers. In some embodiments, the upper protection layer 110 may have a thickness of about 10 micrometers. The upper protection layer 110 may be bonded to the dielectric barrier film 130 by a thermocompression bonding or may be bonded to the dielectric barrier film 130 or the upper electrode 120*a* using an adhesive layer. The upper protection layer 110 may be partially removed to expose the upper pad 120*b*.

In certain embodiments, the upper protection layer 110 may be formed on the dielectric barrier film 130 provided with the upper electrode 120*a* through a coating process.

The lower protection layer 150 may be in direct contact with a wrapping target and may be used to protect the lower electrode 140*a*. The lower protection layer 150 may include polypropylene. The lower protection layer 150 may include the same material as the dielectric barrier film. The lower protection layer 150 may have a thickness of several tens of mm to several hundred mm. In some embodiments, the lower protection layer 150 may have a thickness of about 200 micrometers. The lower protection layer 150 may be partially removed to expose the lower pad 140*b*.

The lower electrode 140*a* may be coated on the bottom surface of the dielectric barrier film 130 or on the top surface of the lower protection layer 150. The lower protection layer 150 may be bonded to the dielectric barrier film 130 by a thermocompression bonding process or using an adhesive layer.

In certain embodiments, the lower protection layer 150 may be formed on the bottom surface of the dielectric barrier film 130, on which the lower electrode 140a is provided, through a coating process.

An external power 160 may be configured to output an alternating current (AC) power of low frequency (e.g., from 1 kHz to 100 kHz). The AC power may be output in various waveforms (e.g., in the form of a sinusoidal wave, a square wave, or a pulsed wave). The AC power may be output in such a way that a peak voltage thereof is within a typical range of dielectric breakdown voltage (e.g., from 1 kV to 10 kV). A gas temperature and an electrode temperature caused by the plasma may be important in treating a temperature-sensitive object (e.g., raw meat). In such a case of the temperature-sensitive object, if a pulse voltage having a pulse width from several tens to several hundreds of nano seconds and a repetition rate of 1 kHz-100 kHz is used, it is possible to maintain the temperatures close to the room temperature.

The plasma to be used in the present embodiments may be generated by a dielectric barrier discharge, and at least one of inert gases (e.g., helium, argon, or neon), oxygen, nitrogen, or the air may be used as a discharge gas for generating the plasma at the atmospheric pressure. The wrapping container 10 may be treated in such a way that a small amount of oxygen is contained therein.

The type of substitution gas, which can be used as the discharge gas for the plasma, may vary depending on the packaged food, and in some embodiments, nitrogen, oxygen, and carbon dioxide may be used as the substitution gas. Since reactive nitrogen species and reactive oxygen species play an important role in microbial sterilization using the atmospheric pressure plasma, it may be necessary to substitute more than 1 mole percent of oxygen or nitrogen gas. Since the air has a molar composition ratio ($N_2:O_2$=78.09:20.95), it may be suitably used for the dielectric barrier discharge and for an effective sterilization without an additional gas cost.

The sterilization film 100 may be used to generate the atmospheric pressure plasma for the sterilization. The sterilization film 100 may include the dielectric barrier film 130, the upper electrode layer 120, the lower electrode layer 140, and the lower protection layer 150. Here, the dielectric barrier film 130 may be provided to have a flexible property, and the upper electrode layer 120 may be provided on the top surface of the dielectric barrier film 130 and may include the upper electrode 120a, which is provided in the form of a thin-plate, and the upper pad 120b, which is electrically connected to the upper electrode 120a and is used to provide an electrical connection path to the outside. The lower electrode layer 140 may be provided on the bottom surface of the dielectric barrier film 130 and may include the lower electrode 140a, which is provided in a porous screen structure including a plurality of through holes, and the lower pad 140b, which is used to provide an electrical connection path to the lower electrode 140a, and the lower protection layer 150 may be provided to enclose an exposed surface of the lower electrode layer 140 and may be formed of a dielectric material. The upper pad 120b and the lower pad 140b may be electrically connected to the external power 160 and may be used to generate plasma near the lower electrode 140a with the porous screen structure. The sterilization film 100 may further include the lower protection layer 150 for suppressing an abnormal discharge which may occur when the sterilization film 100 is in contact with a liquid material. In addition, the sterilization film 100 may be configured to have a flexible property and thus may be bonded to the wrapping container 10, regardless of the shape of the wrapping container 10.

The sterilization film 100 may have a similar structure to a conventional retort pouch film. The conventional retort pouch film may include an inner layer (e.g., polypropylene), a middle layer (e.g., aluminum), and an outer layer (e.g., polyester). The sterilization film 100 may be formed using a method for fabricating the conventional retort pouch film.

The sterilization film 100 may be used as a part of a flexible sealing container or may be inserted in a sealing container (i.e., it may be used as an element independently of the sealing container). In the case where the sterilization film 100 is independently inserted into the sealing container, the sterilization region 103a may be located in the sealing container, whereas the pad region 103b may be provided in the form of a protrusion, thereby being exposed to the outside of the sealing container. Furthermore, the sealing container may have a sealed space, which is formed by compressing the pad region or the sealing region. In the case where the sealing container has a flexible wrapping container (e.g., a vinyl wrapping container or a retort pouch), the sterilization film 100 may be fastened or fused to the flexible wrapping container through a thermocompression process.

In the case where the sealing container is a fixed plastic container to be coupled using the handle portion, the sterilization film 100 may be packed and sandwiched between body and lid portions of the fixed plastic container, because of a sufficiently small thickness of the sterilization film 100. Accordingly, the sterilization region of the sterilization film 100 may be located in the plastic sealing container, and the pad region may be located outside the plastic sealing container.

Figure 3A:
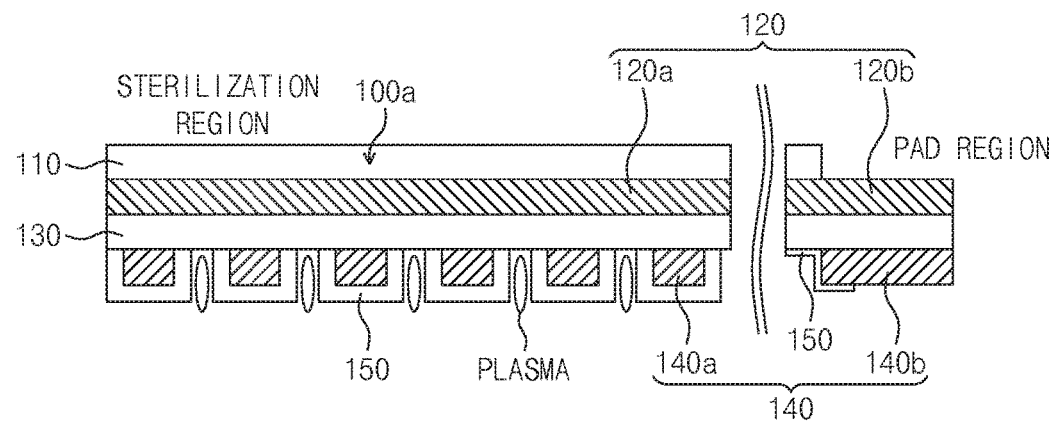
FIGS. 3A through 3C are sectional views illustrating a multi-layered sterilization film according to some embodiments.
Figure 3B:
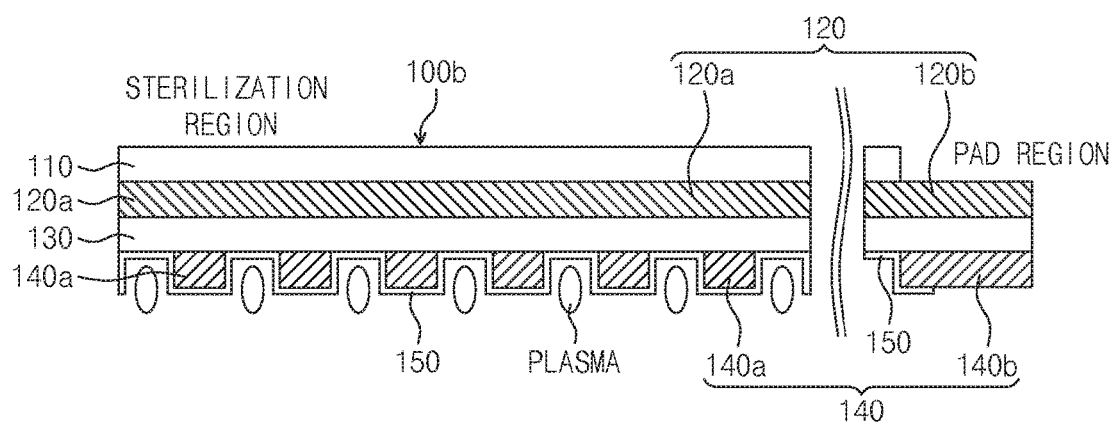
Figure 3C:
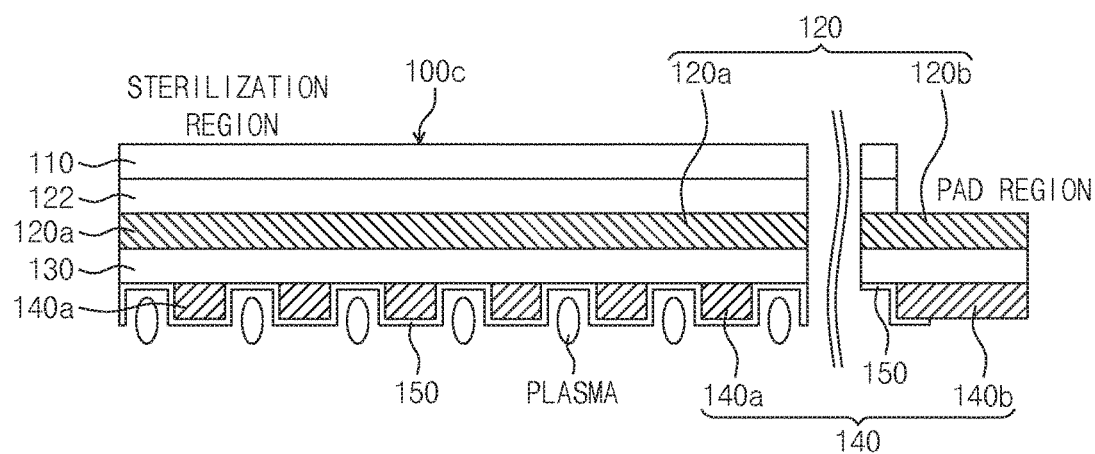

FIGS. 3A through 3C are sectional views illustrating a multi-layered sterilization film according to some embodiments.

Referring to FIG. 3A, a sterilization film 100a may include a dielectric barrier film 130, an upper electrode layer 120, a lower electrode layer 140, and a lower protection layer 150. Here, the dielectric barrier film 130 may be provided to have a flexible property, and the upper electrode layer 120 may be provided on the top surface of the dielectric barrier film 130 and may include an upper electrode 120a, which is provided in the form of a thin-plate, and an upper pad 120b, which is electrically connected to the upper electrode 120a and is used to provide an electrical connection path to the outside. The lower electrode layer 140 may be provided on the bottom surface of the dielectric barrier film 130 and may include a lower electrode 140a, which is provided in a porous screen structure with a plurality of through holes, and a lower pad 140b, which is used to provide an electrical connection path to the lower electrode 140a, and the lower protection layer 150 may be provided to enclose an exposed surface of the lower electrode layer 140 and may be formed of a dielectric material. The upper pad 120b and the lower pad 140b may be electrically connected to the external power 160 and may be used to generate plasma near the lower electrode 140a with the porous screen structure.

The upper protection layer 110 may be provided on the upper electrode layer 120. The upper protection layer 110 may be formed of or include at least one of polyethylene, polypropylene, polystyrene, or polyester.

The lower protection layer 150 may be formed of or include at least one of polyethylene, polypropylene, polystyrene, or polyester. The lower protection layer 150 may be provided to cover only bottom and side surfaces of the through hole of the porous screen structure.

The dielectric barrier film 130 may be formed of or include at least one of polytetrafluoroethylene (PTFE), polyethylene, polypropylene, polystyrene, or polyester.

The upper electrode layer 120 and the lower electrode layer 140 may include copper or aluminum.

The lower protection layer 150 may have a plurality of through holes, each of which is aligned to a corresponding one of the through holes of the lower electrode 140*a*. The lower electrode 140*a* may be a porous screen structure with a plurality of plurality of holes. The lower protection layer 150 may be bonded to the dielectric barrier film 130, on which the lower electrode 140*a* is provided, by a thermocompression bonding process or using an adhesive layer.

Referring to FIG. 3B, a sterilization film 100*b* may be configured to perform a dielectric barrier discharge. The lower protection layer 150 may be provided to conformally cover the lower electrode 140*a* and an exposed bottom surface of the dielectric barrier film 130. The lower protection layer 150 may be formed by a coating process. In certain embodiments, the lower protection layer 150 may be bonded to the dielectric barrier film 130, on which the lower electrode 140*a* is provided, by a thermocompression bonding process or using an adhesive layer.

Referring to FIG. 30, a sterilization film 100*c* may be configured to perform a dielectric barrier discharge. An abrasion-resistance layer 122 may be provided between the upper electrode layer 120 and the upper protection layer 110. The abrasion-resistance layer 122 may be configured to protect an internal layer from impact or damage. The abrasion-resistance layer 122 may be formed of or include polyethyleneterephthalate (PET) or nylon.

Figure 4:
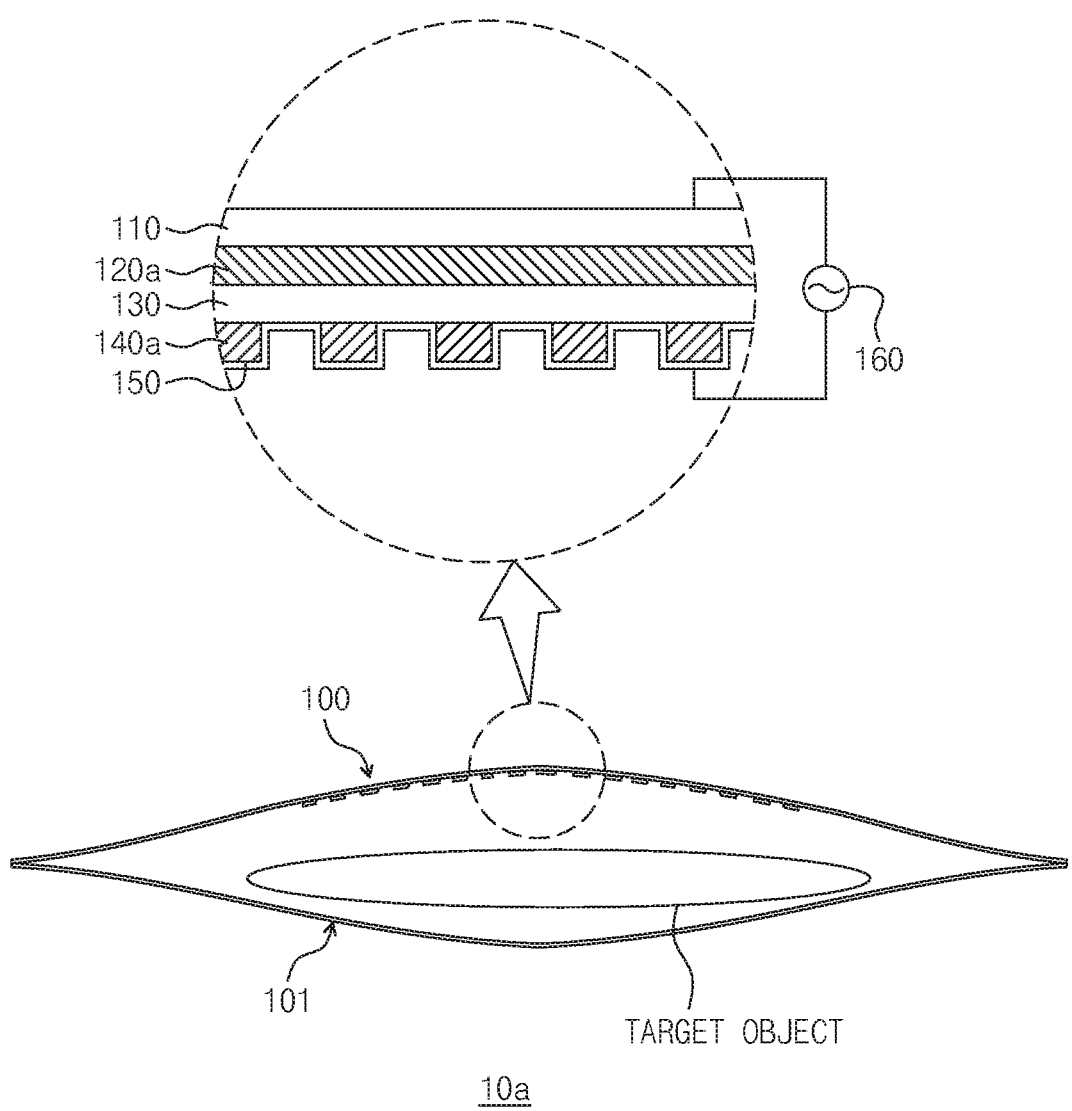
FIG. 4 is a diagram illustrating a wrapping container according to other embodiments.

FIG. 4 is a diagram illustrating a wrapping container according to other embodiments of the inventive concept.

Referring to FIG. 4, a wrapping container 10*a* may be configured to hermetically seal a target object by using a wrapping film 101. A portion of the wrapping film 101 may include a sterilization film 100. The sterilization film 100 may include an upper electrode 120*a* shaped like a plate, an upper protection layer 110 provided on the upper electrode 120*a*, a lower electrode 140*a* provided under the upper electrode 120*a* and in a porous screen structure, a lower protection layer 150 provided under the lower electrode 140*a*, and a dielectric barrier film 130 provided between the upper and lower electrodes 120*a* and 140*a*.

The wrapping container 10*a* may include a wrapping film 101 and a sterilization film 100, which are coupled to each other and are respectively used as opposite surfaces of the wrapping container 10*a*. Edge regions of the sterilization and wrapping films 100 and 101 may be fused and bonded by a thermocompression bonding process. The sterilization film 100 may be used to induce a dielectric barrier discharge in the wrapping container 10*a*, if an electric power is supplied to the sterilization film 100 from an external power.

The wrapping film 101 may be formed of or include at least one of polyethylene, polypropylene, polystyrene, polyvinyl, or polyester. The wrapping film 101 may include an inner layer (e.g., polypropylene), a middle layer (e.g., aluminum), and an outer layer (e.g., polyester), similar to the retort pouch film.

The sterilization film 100 may include a sterilization region and a pad region, and the pad region may be provided in such a way that it is exposed to the outside of the wrapping container.

Figure 5:
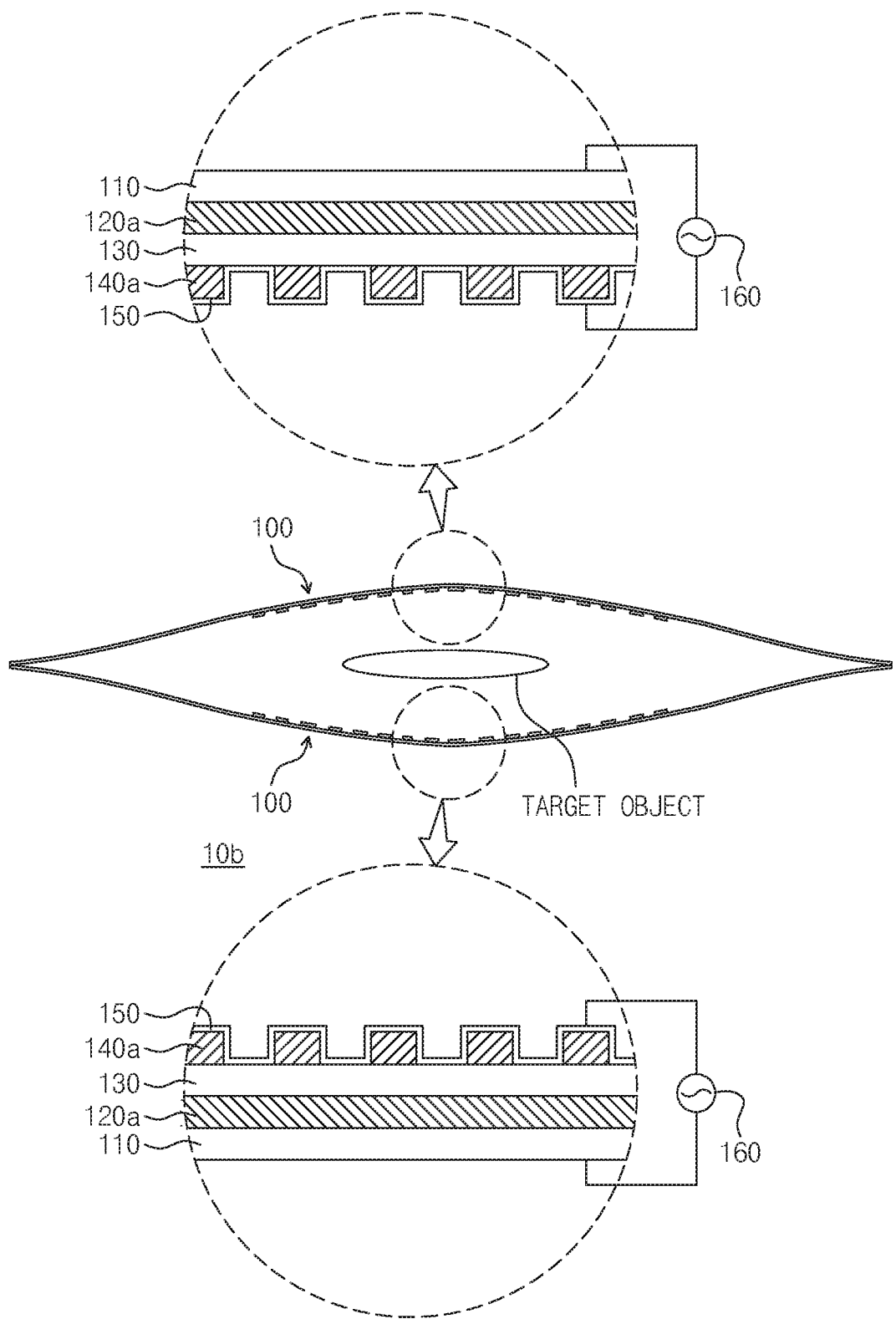
FIG. 5 is a diagram illustrating a wrapping container according to still other embodiments.

FIG. 5 is a diagram illustrating a wrapping container according to still other embodiments of the inventive concept.

Referring to FIG. 5, a wrapping container 10*b* may be configured to hermetically seal a target object by using a wrapping film. A portion, or the entirety, of the wrapping film may include a sterilization film 100. The sterilization film 100 may include an upper electrode 120*a* shaped like a plate, an upper protection layer 110 provided on the upper electrode 120*a*, a lower electrode 140*a* provided under the upper electrode 120*a* and in a porous screen structure, a lower protection layer 150 provided under the lower electrode 140*a*, and a dielectric barrier film 130 provided between the upper and lower electrodes 120*a* and 140*a*.

The wrapping container 10*b* may include a first sterilization film and a second sterilization film, which are coupled to each other and are respectively used as opposite surfaces of the wrapping container 10*b*. Edge regions of the first and second sterilization films may be fused and bonded by a thermocompression bonding process. The first or second sterilization film may be used to induce a dielectric barrier discharge in the wrapping container 10*b*, if an electric power is supplied to the sterilization film 100 from an external power 160.

The sterilization film 100 may include a sterilization region and a pad region.

Figure 6:
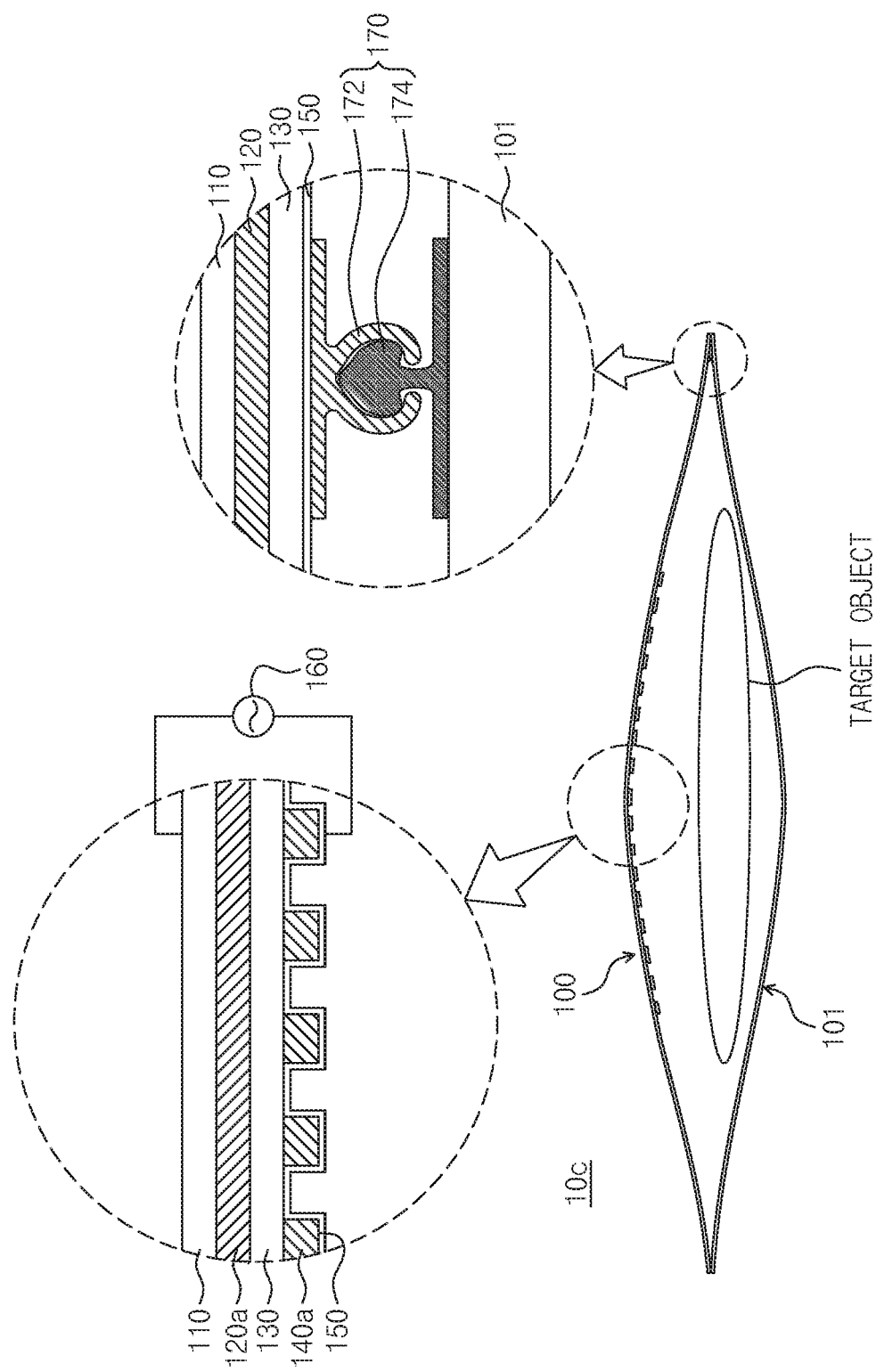
FIG. 6 is a diagram illustrating a wrapping container according to yet other embodiments.

FIG. 6 is a diagram illustrating a wrapping container according to yet other embodiments of the inventive concept.

Referring to FIG. 6, a wrapping container 10*c* may be configured to hermetically seal a target object by using a wrapping film. A portion, or the entirety, of the wrapping film may include a sterilization film. The sterilization film may include an upper electrode 120*a* connected to an external power 160, an upper protection layer 110 provided on the upper electrode 120*a*, a lower electrode 140*a* provided under the upper electrode 120*a* and in a porous screen structure, a lower protection layer 150 provided under the lower electrode 140*a*, and a dielectric barrier film 130 provided between the upper and lower electrodes 120*a* and 140*a*. The sterilization film 100 may include a sterilization region and a pad region.

The wrapping container 10*c* may include a zipper lock 170 which is formed around a passage (e.g., an entrance of the wrapping container 10*c*), through which a target object can enter or exit. For example, the zipper lock 170 may include a male part 174 and a female part 172 which are respectively provided on a wrapping film 101 and the sterilization film 100. If the male part 174 of the zipper lock 170 is inserted into or separated from the female part 172 of the zipper lock 170, the entrance of the wrapping container 10*c* may be closed or opened.

Figure 7:
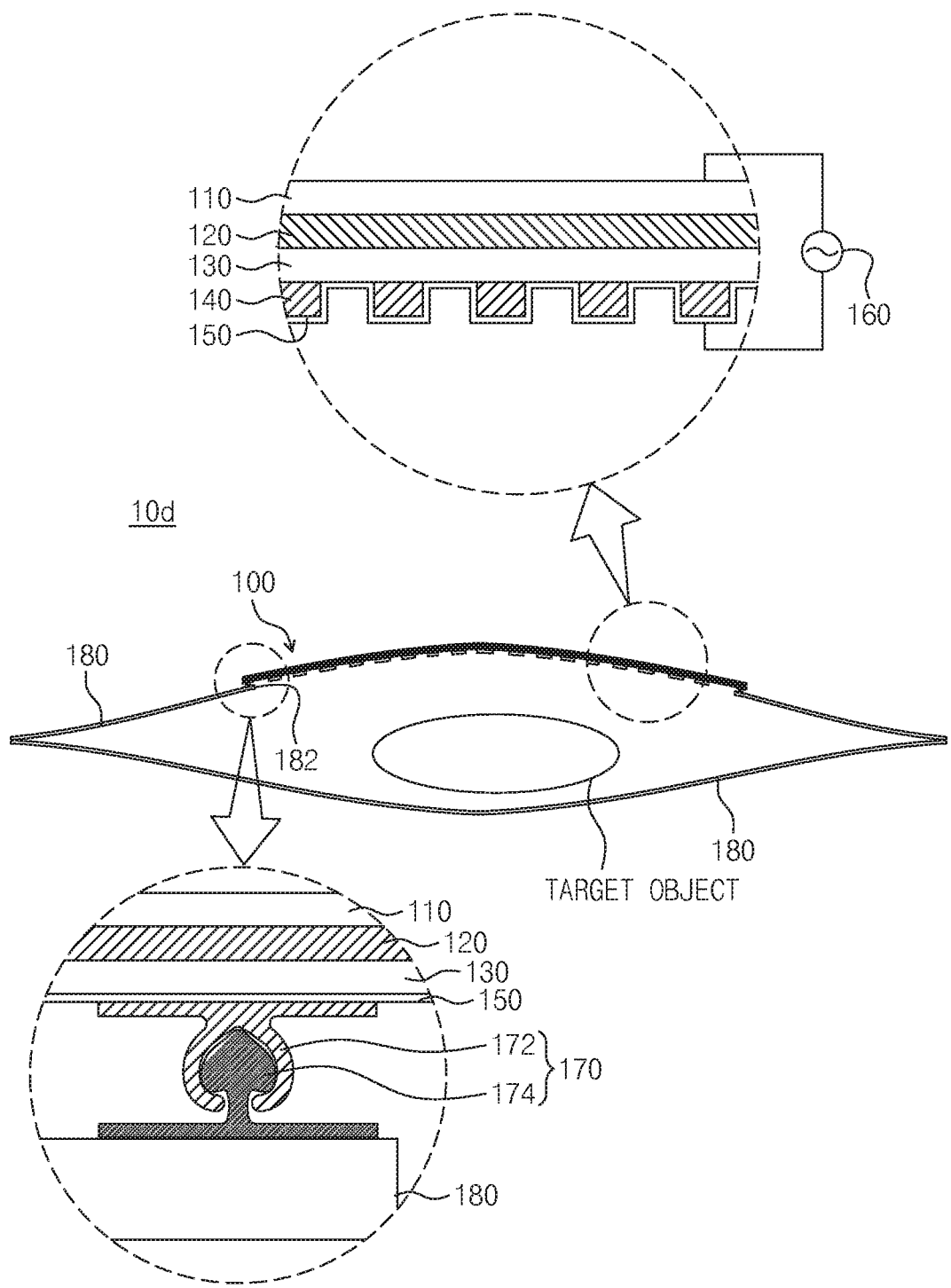
FIG. 7 is a diagram illustrating a wrapping container according to even other embodiments.

FIG. 7 is a diagram illustrating a wrapping container according to even other embodiments of the inventive concept.

Referring to FIG. 7, a wrapping container 10*d* may be configured to seal a target object using a wrapping film 180. The wrapping container 10*d* may include a wrapping film 180, which is provided to define an opening 182 and to enclose the target object, and a sterilization film 100, which is provided to cover the opening 182 of the wrapping film 180 and is used to generate plasma. The sterilization film 100 may include an upper electrode 120*a* shaped like a plate, an upper protection layer 110 provided on the upper electrode 120*a*, a lower electrode 140*a* provided under the upper electrode 120*a* and in a porous screen structure, a lower protection layer 150 provided under the lower electrode 140a, and a dielectric barrier film 130 provided between the upper and lower electrodes 120a and 140a. The sterilization film 100 may include a sterilization region and a pad region.

The wrapping film 180 may be formed of or include at least one of polyethylene, polypropylene, polystyrene, polyvinyl, or polyester. The wrapping film may include an inner layer (e.g., polypropylene), a middle layer (e.g., aluminum), and an outer layer (e.g., polyester), similar to the retort pouch film.

The wrapping film 180 may be provided to include the opening 182 and to enclose the target object. The sterilization film 100 may be provided to cover the opening 182 of the wrapping film 180. The sterilization film 100 may include a sterilization region and a pad region. The wrapping film 180 may be coupled to the sterilization film 100 using a zipper lock 170. The zipper lock 170 may include a male part 174 and a female part 172, which are provided on the wrapping film 180 and the sterilization film 100, respectively. If the male part 174 of the zipper lock 170 is inserted into or separated from the female part 172 of the zipper lock 170, the opening 182 of the wrapping film 180 may be closed or opened.

In certain embodiments, the wrapping film 180 may be bonded to the sterilization film 100 by a thermocompression bonding process or using an adhesive layer.

The dielectric barrier film 130 may include at least one of polytetrafluoroethylene (FIFE), polyethylene, polypropylene, polystyrene, and polyester. For example, the upper protection layer 110 may be formed of polyether, and the lower protection layer 150 may be formed of polypropylene.

Figure 8:
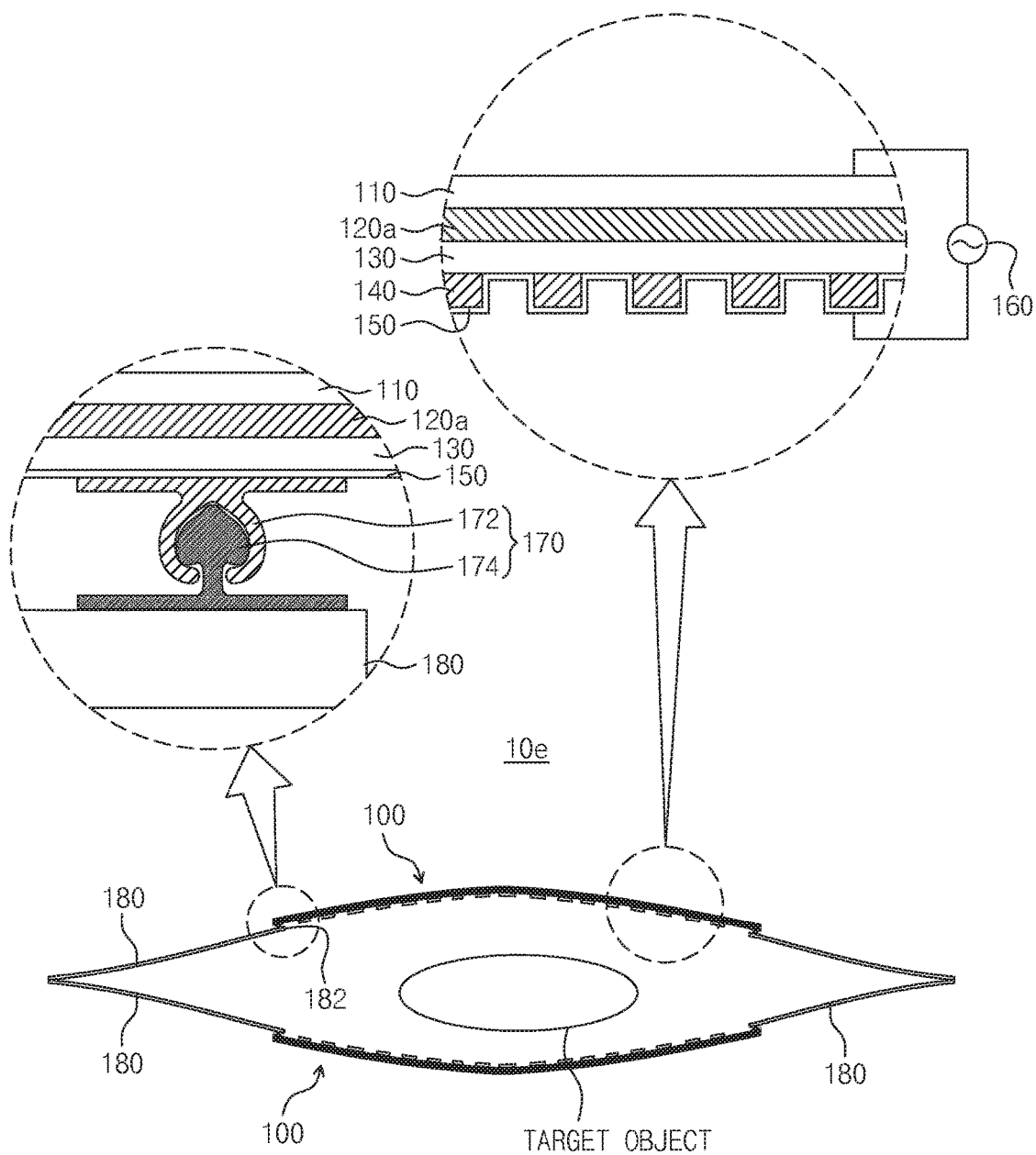
FIG. 8 is a diagram illustrating a wrapping container according to further embodiments.

FIG. 8 is a diagram illustrating a wrapping container according to further embodiments of the inventive concept.

Referring to FIG. 8, a wrapping container 10e may be configured to hermetically seal a target object by using a wrapping film. The wrapping container 10e may include a wrapping film 180, which is provided to define an opening 182 and to enclose the target object, and a sterilization film 100, which is provided to cover the opening 182 of the wrapping film 180 and is used to generate plasma. The sterilization film 100 may include an upper electrode 120a shaped like a plate, an upper protection layer 110 provided on the upper electrode 120a, a lower electrode 140a provided under the upper electrode 120a and in a porous screen structure, a lower protection layer 150 provided under the lower electrode 140a, and a dielectric barrier film 130 provided between the upper and lower electrodes 120a and 140a. The sterilization film 100 may include a sterilization region and a pad region.

The wrapping container 10e may be provided to have a pair of openings 182. The pair of the openings 182 may be provided at two opposite sides of the wrapping container 10e. The sterilization film 100 may be provided to cover each of the openings 182. The wrapping film 180 may be coupled to the sterilization film 100 using a zipper lock 170.

Figure 9A:
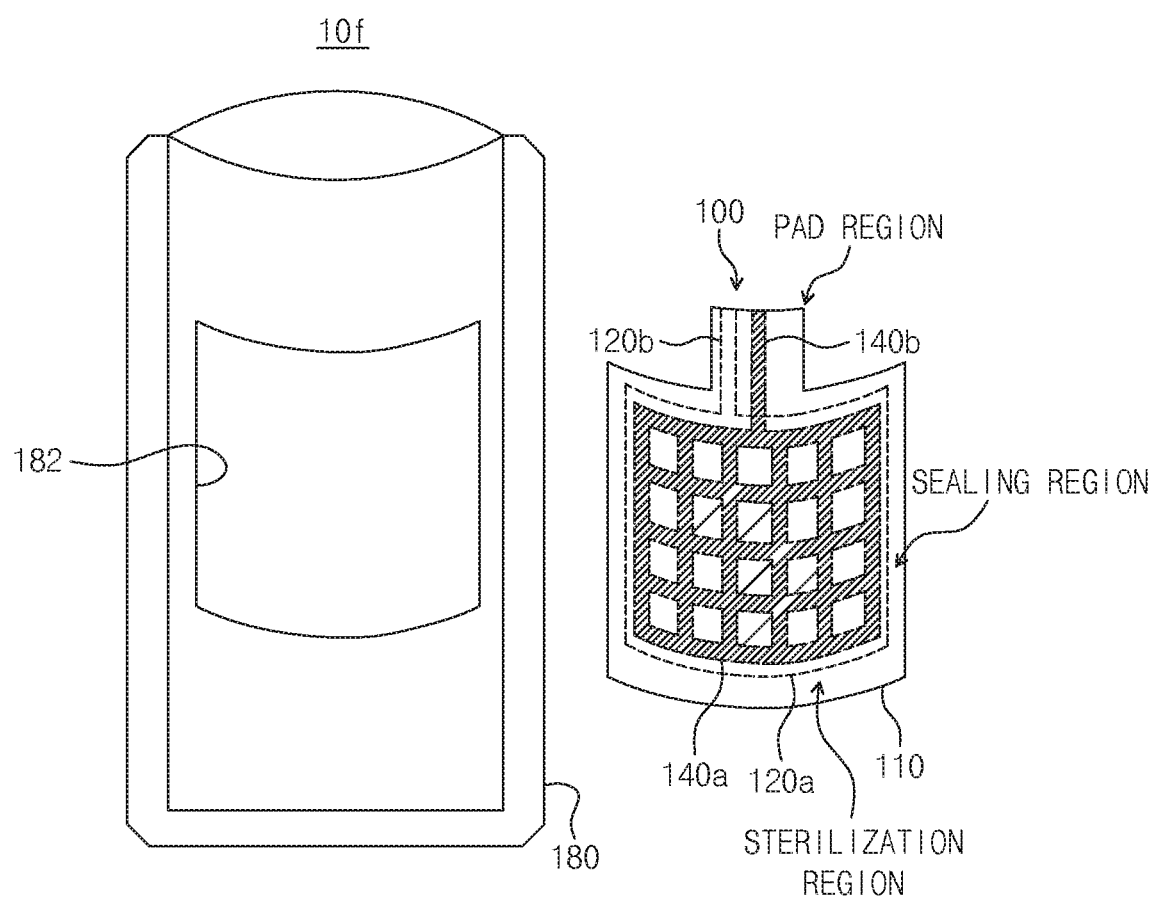
FIG. 9A is a diagram illustrating a wrapping container according to still further embodiments.

FIG. 9A is a diagram illustrating a wrapping container according to still further embodiments of the inventive concept.

Figure 9B:
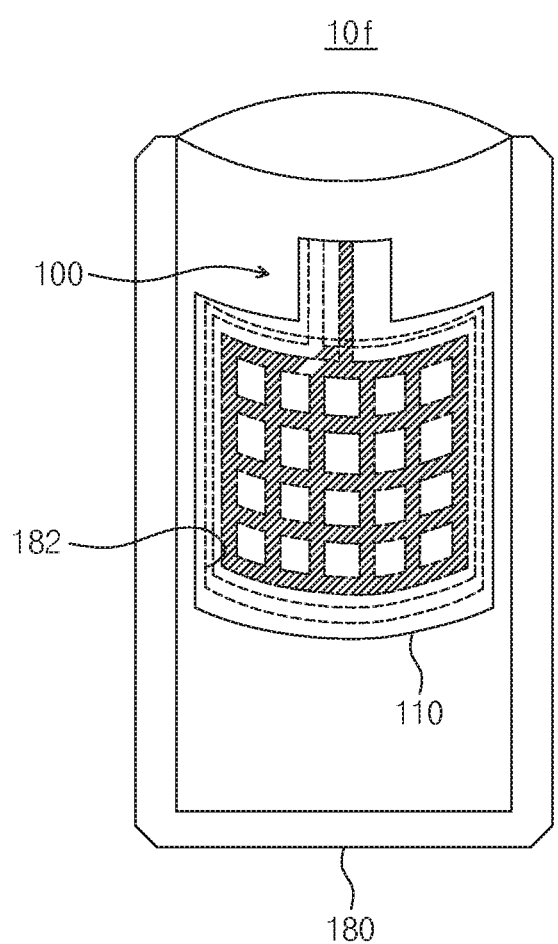
FIG. 9B is a diagram illustrating a bonded state of the wrapping container of FIG. 9A.

FIG. 9B is a diagram illustrating a bonded state of the wrapping container of FIG. 9A.

FIG. 9C is the sectional view of FIG. 9A.

Referring to FIGS. 9A through 9C, a wrapping container 10f may be configured to seal a target object using a wrapping film. The wrapping container 10f may include a wrapping film 180, which is provided to define an opening 182 and to enclose the target object, and a sterilization film 100, which is provided to cover the opening 182 of the wrapping film 180 and is used to generate plasma. The sterilization film 100 may include an upper electrode 120a shaped like a plate, an upper protection layer 110 provided on the upper electrode 120a, a lower electrode 140a provided under the upper electrode 120a and in a porous screen structure, a lower protection layer 150 provided under the lower electrode 140a, and a dielectric barrier film 130 provided between the upper and lower electrodes 120a and 140a.

The wrapping film 180 may be formed of or include at least one of polyethylene, polypropylene, polystyrene, polyvinyl, or polyester. The wrapping film 180 may include an inner layer (e.g., polypropylene), a middle layer (e.g., aluminum), and an outer layer (e.g., polyester), similar to the retort pouch film. The wrapping film 180 may be bonded to the sterilization film 100 by a thermocompression bonding process or an adhesive layer.

The sterilization film 100 may include a sterilization region, a sealing region, and a pad region. The pad region may be provided to have a structure protruding from the sterilization region. The sterilization region may be provided to have a structure, in which the lower protection layer 150, the lower electrode 140a, the dielectric barrier film 130, the upper electrode 120a, and the upper protection layer 110 are sequentially stacked. The pad region may include a lower pad 140b, the dielectric discharge film 130, and an upper pad 120b, which are sequentially stacked. The sealing region may include the lower protection layer 150, the dielectric barrier film 130, and the upper protection layer 110, which are sequentially stacked. The sealing region may further include one of upper and lower electrodes. The upper pad may be provided at a position shifted from the lower pad, and thus, the upper and lower pads may not face each other. The pad region may be provided in such a way that it is exposed to the outside, and thus, the pad region may be electrically connected to an external power.

An adhesive layer may be used to attach or detach the sterilization film 100 to or from the wrapping container. In certain embodiments, the sterilization film 100 may be fixedly coupled to the wrapping container by a thermocompression bonding method.

In certain embodiments, the sterilization film 100 may be coupled to the wrapping container using a coupling element such as a zipper lock.

Figure 10:
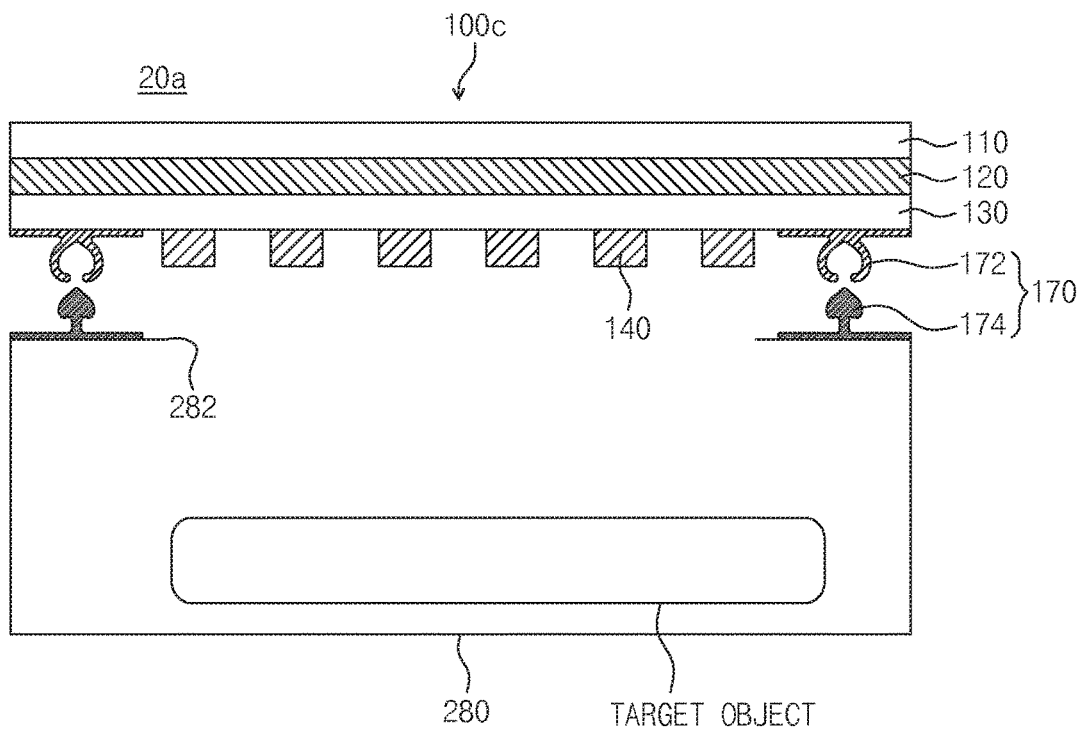
FIGS. 10 through 12 are diagrams wrapping containers according to some embodiments.
Figure 11:
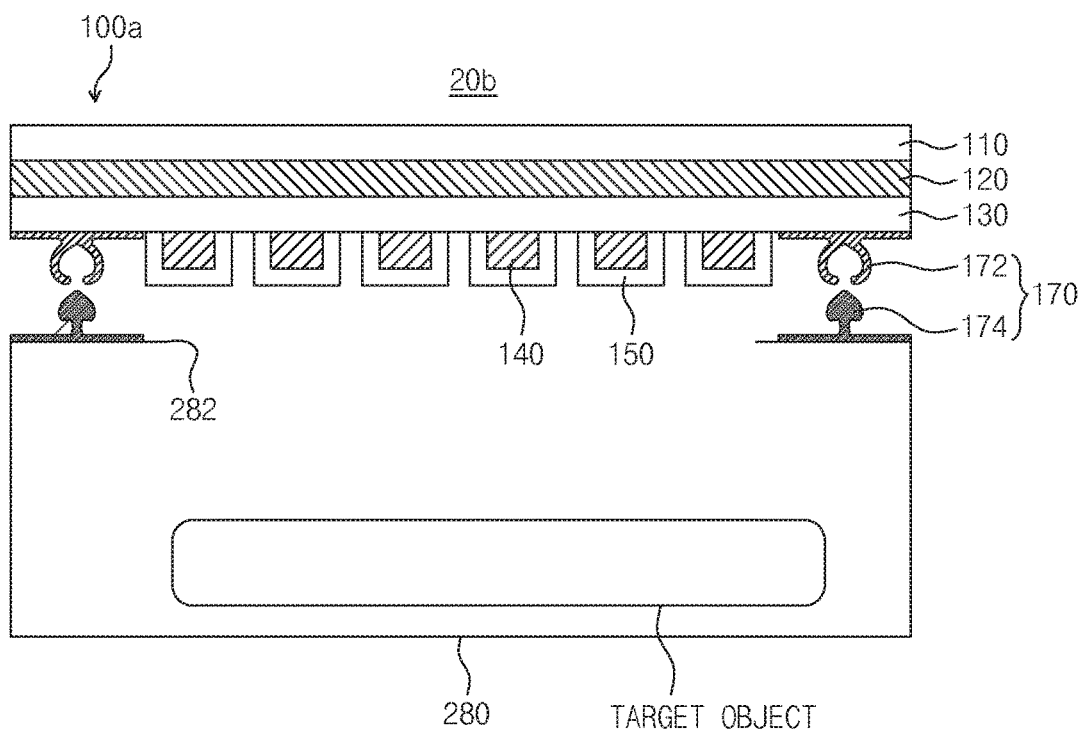
Figure 12:
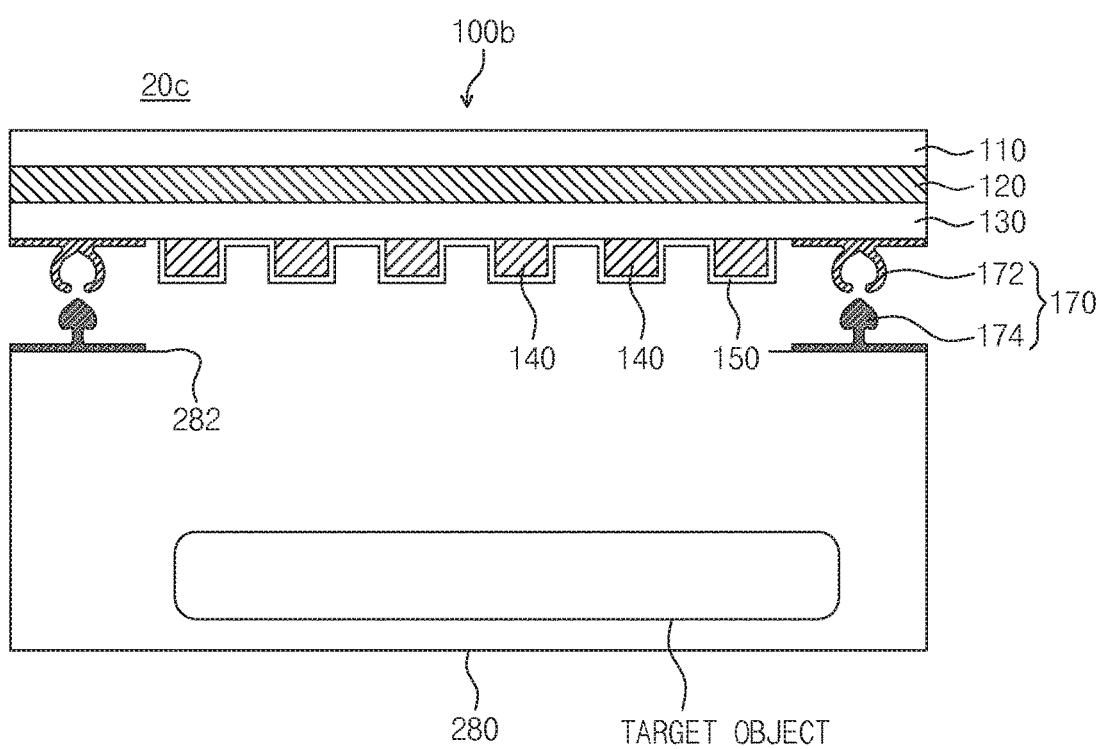

FIGS. 10 through 12 are diagrams wrapping containers according to some embodiments.

Referring to FIG. 10, a storage container 20a may be configured to seal a target object. The storage container 20a may include a main storage container 280, which is provided to include an opening 282 and is used to contain the target object, and a sterilization film 100c, which is used to cover the opening 282 of the main storage container 280 and to generate plasma. The sterilization film 100c may include an upper electrode layer 120 shaped like a plate, an upper protection layer 110 provided on the upper electrode layer 120, a lower electrode layer 140 provided under the upper electrode layer 120 and in a porous screen structure, a lower protection layer 150 provided under the lower electrode layer 140, and a dielectric barrier film 130 provided between the upper and lower electrode layers 120 and 140.

The main storage container 280 may be a plastic or glass container. The main storage container 280 may have a fixed shape.

The sterilization film 100c may include the lower electrode layer 140 with a porous screen structure, the dielectric barrier film 130, the upper electrode layer 120, and the upper protection layer 110, which are sequentially stacked. The sterilization film 100c may include a sterilization region and a pad region.

The sterilization film 100c may be provided to cover the opening 282 of the main storage container 280. The sterilization film 100c may be coupled to or separated from the opening 282 of the main storage container 280 using a coupling element such as a zipper lock 170. The zipper lock 170 may include a male part 174, which is provided around the opening 282 of the main storage container 280, and a female part 172, which is provided along an edge region of the sterilization film 100c. If the male part 174 of the zipper lock 170 is inserted into or separated from the female part 172 of the zipper lock, the opening 282 of the main storage container 280 may be closed or opened.

Referring to FIG. 11, a storage container 20b may be configured to seal a target object. The storage container 20b may include a main storage container 280, which is provided to include an opening 282 and is used to contain the target object, and a sterilization film 100a, which is provided to cover the opening 282 of the main storage container 280 and is used to generate plasma. The sterilization film 100a may include an upper electrode layer 120 shaped like a plate, an upper protection layer 110 provided on the upper electrode layer 120, a lower electrode layer 140 provided under the upper electrode layer 120 and in a porous screen structure, a lower protection layer 150 provided under the lower electrode layer 140, and a dielectric barrier film 130 provided between the upper and lower electrode layers 120 and 140.

The sterilization film 100a may include the lower protection layer 150 having a porous screen structure, the lower electrode layer 140, the dielectric barrier film 130, the upper electrode layer 120, and the upper protection layer 110, which are sequentially stacked. The lower protection layer 150 may be provided to cover side and bottom surfaces of the porous screen structure. The sterilization film 100a may include a sterilization region and a pad region.

Referring to FIG. 12, a storage container 20c may be configured to seal a target object. The storage container 20c may include a main storage container 280, which is provided to include an opening 282 and is used to contain the target object, and a sterilization film 100b, which is used to cover the opening 282 of the main storage container 280 and to generate plasma. The sterilization film 100b may include an upper electrode layer 120 shaped like a plate, an upper protection layer 110 provided on the upper electrode layer 120, a lower electrode layer 140 provided under the upper electrode layer 120 and in a porous screen structure, a lower protection layer 150 provided under the lower electrode layer 140, and a dielectric barrier film 130 provided between the upper and lower electrode layers 120 and 140.

The sterilization film 100b may include the lower protection layer 150 having a porous screen structure, the lower electrode layer 140, the dielectric barrier film 130, the upper electrode layer 120, and the upper protection layer 110, which are sequentially stacked. The lower protection layer 150 may be provided to cover side and bottom surfaces of the porous screen structure and to cover an exposed surface of the dielectric barrier film. The sterilization film 100b may include a sterilization region and a pad region.

Figure 13:
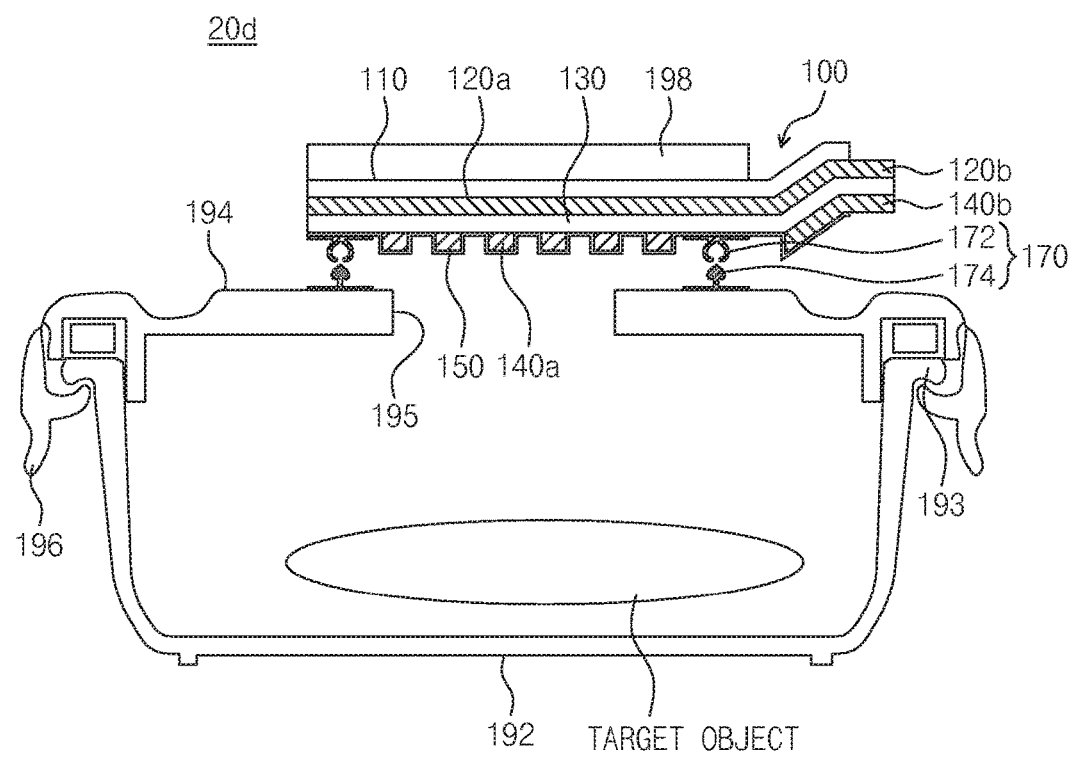
FIG. 13 is a diagram illustrating a storage container according to some embodiments.

FIG. 13 is a diagram illustrating a storage container according to some embodiments.

Referring to FIG. 13, a storage container 20d may be configured to store a target object. The storage container 20d may be configured to provide an internal space, in which the target object can be stored, and may include a body 192, a lid portion 194, and a sterilization film 100. Here, the body 192 may be provided to define an opening and may be formed of at least one of glass or plastic materials, and the lid portion 194 may be provided near the opening of the body 192 of the storage container 20d and may have a through hole 195 provided at a center region thereof. The lid portion 194 may be formed of at least one of plastic materials. The sterilization film 100 may be provided near the through hole 195 of the lid portion 194 and may be used to generate plasma. The sterilization film 100 may include an upper electrode 120a provided in a plate shape, a lower electrode 140a having a porous screen structure, and a dielectric barrier film 130 between the upper and lower electrodes 120a and 140a.

The lid portion 194 may include at least one lock handle 196 coupled to each side portion of the lid portion 194. The lock handle 196 may be coupled to a protrusion 193, which is provided along an outer top sidewall of the body 192 and near the opening, in an insertion manner. The sterilization film 100 may be coupled to a top surface of the lid portion 194 using a zipper lock 170 or an adhesive layer.

An auxiliary lid portion 198 may be formed of at least one of plastic materials and may be provided on the through hole 195 of the lid portion 194. The sterilization film 100 may be provided on a bottom surface of the auxiliary lid portion 198. The sterilization film 100 may be coupled to the auxiliary lid portion 198 using an adhesive layer.

The sterilization film 100 may include a sterilization region and a pad region. The pad region may include an upper pad, which is connected to the upper electrode 120a, and a lower pad, which is connected to the lower electrode 140a. The sterilization film 100 may be coupled to the lid portion 194 using the zipper lock 170.

Figure 14:
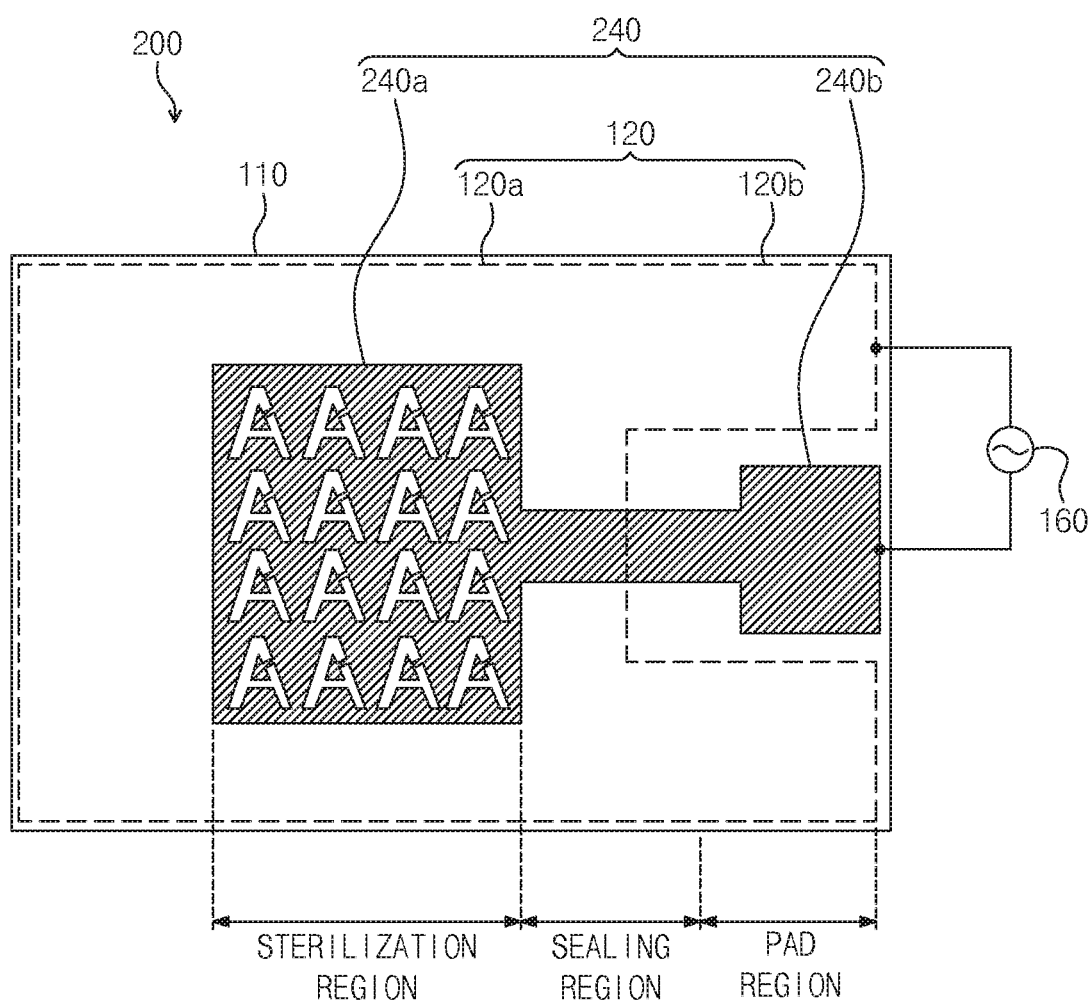
FIG. 14 is a diagram illustrating a sterilization according to some embodiments.

FIG. 14 is a diagram illustrating a sterilization film according to some embodiments.

Referring to FIG. 14, a sterilization film 200 may be configured to generate atmospheric pressure plasma and may be used to sterilize a target object. The sterilization film 200 may include a dielectric barrier film 130, an upper electrode layer 120, a lower electrode layer 240, and a lower protection layer 150. Here, the dielectric barrier film 130 may be provided to have a flexible property, and the upper electrode layer 120 may be provided on the top surface of the dielectric barrier film 130 and may include an upper electrode 120a, which is provided in the form of a thin-plate, and an upper pad 120b, which is electrically connected to the upper electrode 120a and is used to provide an electrical connection path to the outside. The lower electrode layer 240 may be provided on the bottom surface of the dielectric barrier film 130 and may include a lower electrode 240a, which is provided in a porous screen structure including a plurality of through holes, and a lower pad 240b, which is used to provide an electrical connection path to the lower electrode 240a, and the lower protection layer 150 may be provided to enclose an exposed surface of the lower electrode layer 240 and may be formed of a dielectric material. The upper pad 120b and the lower pad 240b may be electrically connected to the external power 160 and may be used to generate plasma near the lower electrode 240a with the porous screen structure. In some embodiments, the sterilization film 200 may include a sterilization region and a pad region. In certain embodiments, the sterilization film 200 may include a sterilization region, a sealing region, and a pad region.

The lower electrode 240a may include at least one pattern shaped like a letter or figure. Accordingly, light, which is emitted from the plasma during a dielectric barrier discharge, may have the same pattern as that of the lower electrode 240*a*. The pattern of the light emitted from the lower electrode 240*a* may be used to provide information on the target object and/or a manufacturer or to display trademarks (i.e., for an advertising effect).

Figure 15:
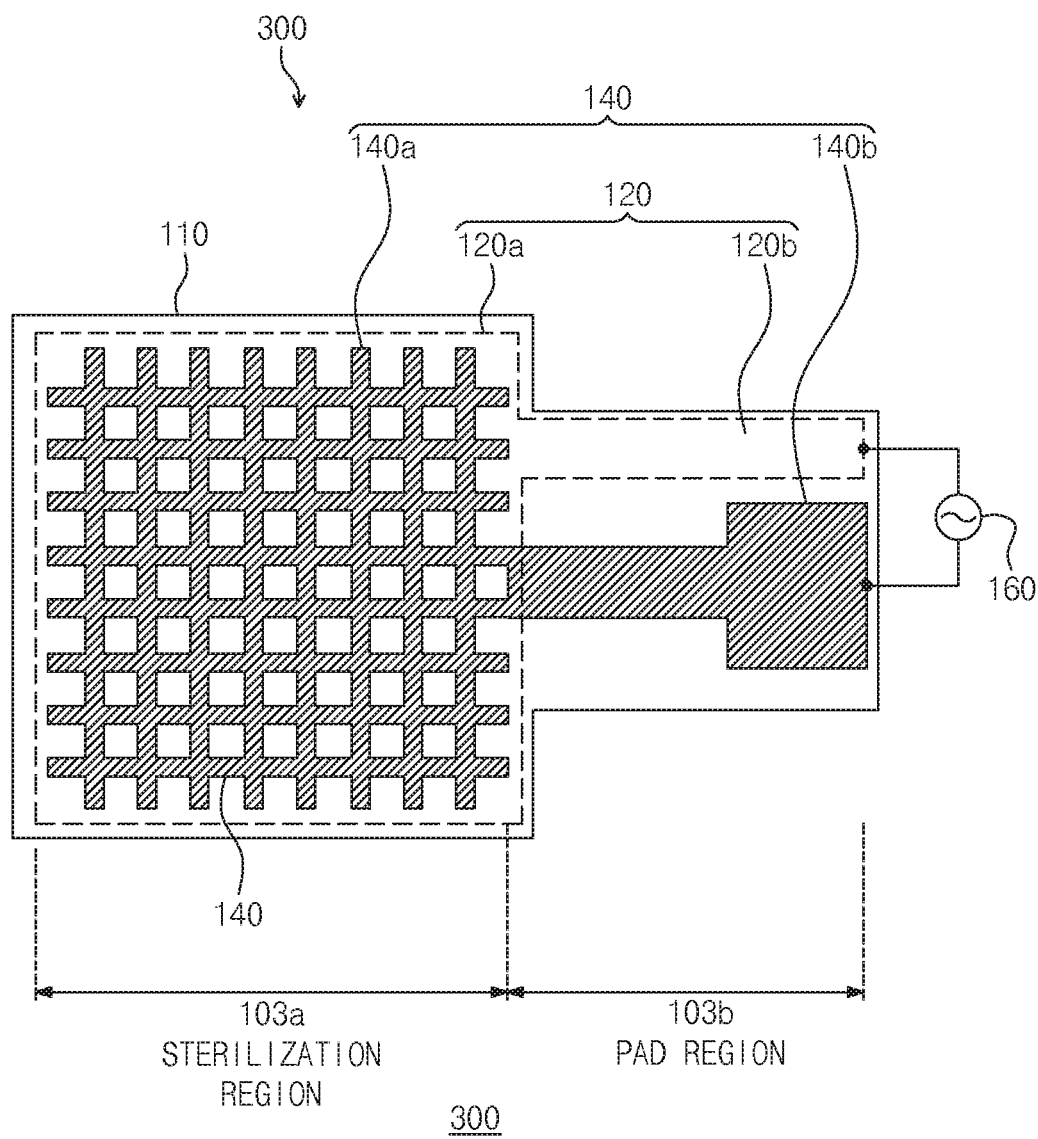
FIG. 15 is a plan view illustrating a sterilization film according to some embodiments.

FIG. 15 is a plan view illustrating a sterilization film according to some embodiments.

Referring to FIG. 15, a sterilization film 300 may include a sterilization region 103*a*, which includes an upper electrode 120*a* provided in a plate shape, a lower electrode 140*a* provided in a porous screen structure, and a dielectric barrier film 130 provided between the upper and lower electrodes 120*a* and 140*a* and is used to generate plasma using them, and a pad region 103*b*, which includes an upper pad 120*b* and a lower pad 140*b* electrically connected to the upper and lower electrodes 120*a* and 140*a*, respectively. The upper and lower electrodes 120*a* and 140*a* may be disposed to face each other, whereas the upper and lower pads 120*b* and 140*b* may be disposed in such a way that they do not face each other.

The sterilization region 103*a* may include the dielectric barrier film 130 with a flexible property, the upper electrode 120*a*, which is provided on a top surface of the dielectric barrier film 130 and has a thin-plate shape, the lower electrode 140*a*, which is provided under a bottom surface of the dielectric barrier film 130 and has a porous screen structure with a plurality of through holes, an upper protection layer 110, which is provided on a top surface of the upper electrode 120*a*, and a lower protection layer 150, which is provided under a bottom surface of the lower electrode 140*a*.

The sterilization region 103*a* may be provided or inserted in a sealing container, a storage container, or a space to be sterilized. The pad region 103*b* may protrude outward from the sealing container, the storage container, and so forth and thus may be used to provide an electrical connection path to the outside. In some embodiments, the pad region 103*b* may have a structure protruding from the sterilization region 103*a*. For example, the pad region 103*b* may be provided in the form of a strip line.

Figure 16:
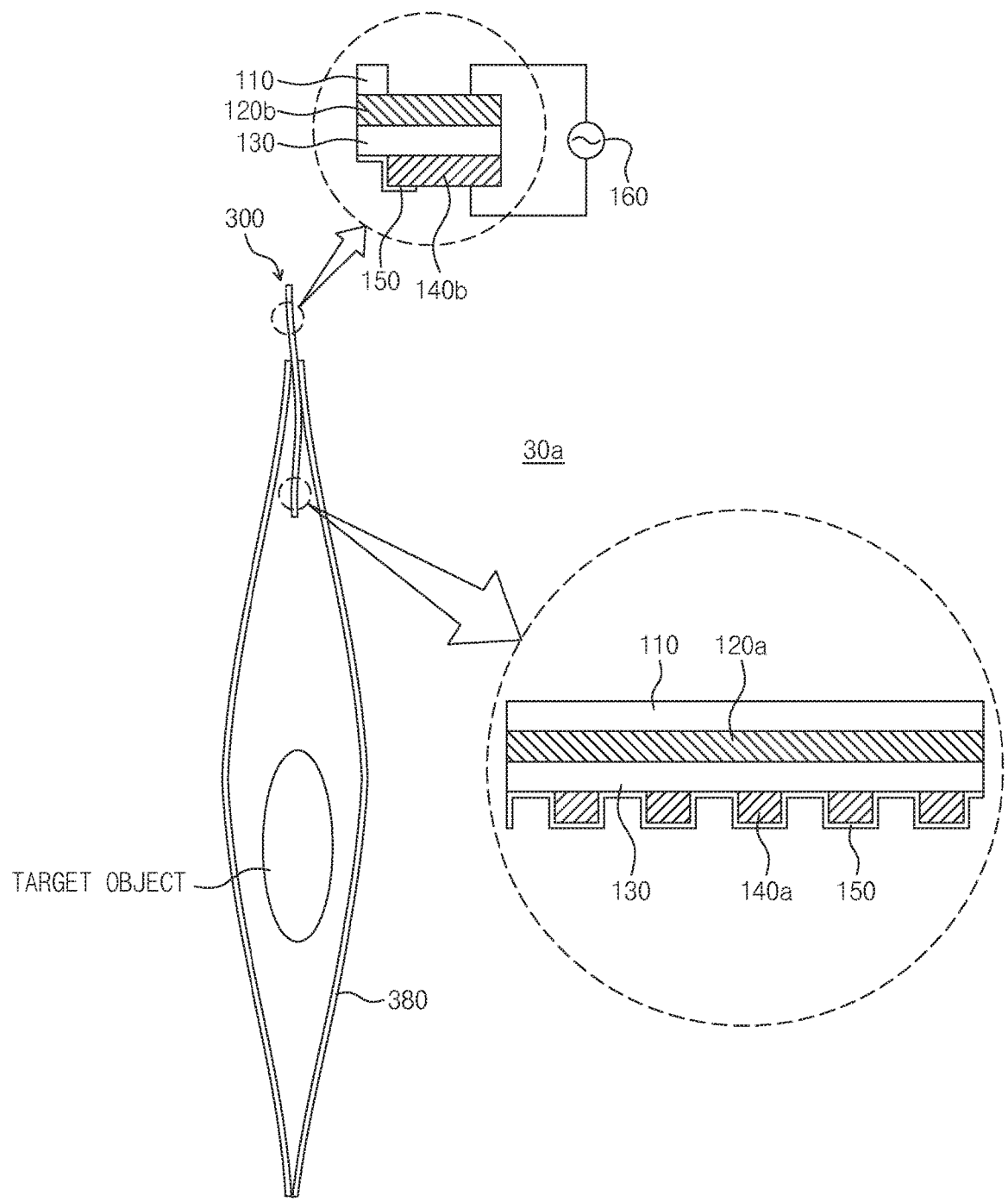
FIG. 16 is a diagram illustrating a wrapping container, in which a sterilization film according to some embodiments is provided.

FIG. 16 is a diagram illustrating a wrapping container, in which a sterilization film according to some embodiments is provided.

Referring to FIG. 16, a wrapping container 30*a* may be configured to hermetically seal a target object by using a wrapping film. The wrapping container 30*a* may include a wrapping film 380 hermetically sealing the target object and a sterilization film 300 including a sterilization region and a pad region. Here, the sterilization region may be provided in a sealed internal space and may be used to generate plasma, and the pad region may be provided in such a way that it is exposed to the outside of the sterilization film 300.

The sterilization region of the sterilization film 300 may include an upper electrode 120*a* shaped like a plate, an upper protection layer 110 provided on the upper electrode 120*a*, a lower electrode 140*a* provided under the upper electrode 120*a* and in a porous screen structure, a lower protection layer 150 provided under the lower electrode 140*a*, and a dielectric barrier film 130 provided between the upper and lower electrodes 120*a* and 140*a*. The upper protection layer 110 and the lower protection layer 150 may be formed of or include the same material (e.g., polypropylene).

The pad region may include a lower pad 140*b*, the dielectric discharge film 130, and an upper pad 120*b*, which are sequentially stacked.

The sterilization film 300 may be sandwiched between a pair of the wrapping films 380 and may be fastened to the wrapping films 380 by a thermocompression bonding method.

Figure 17:
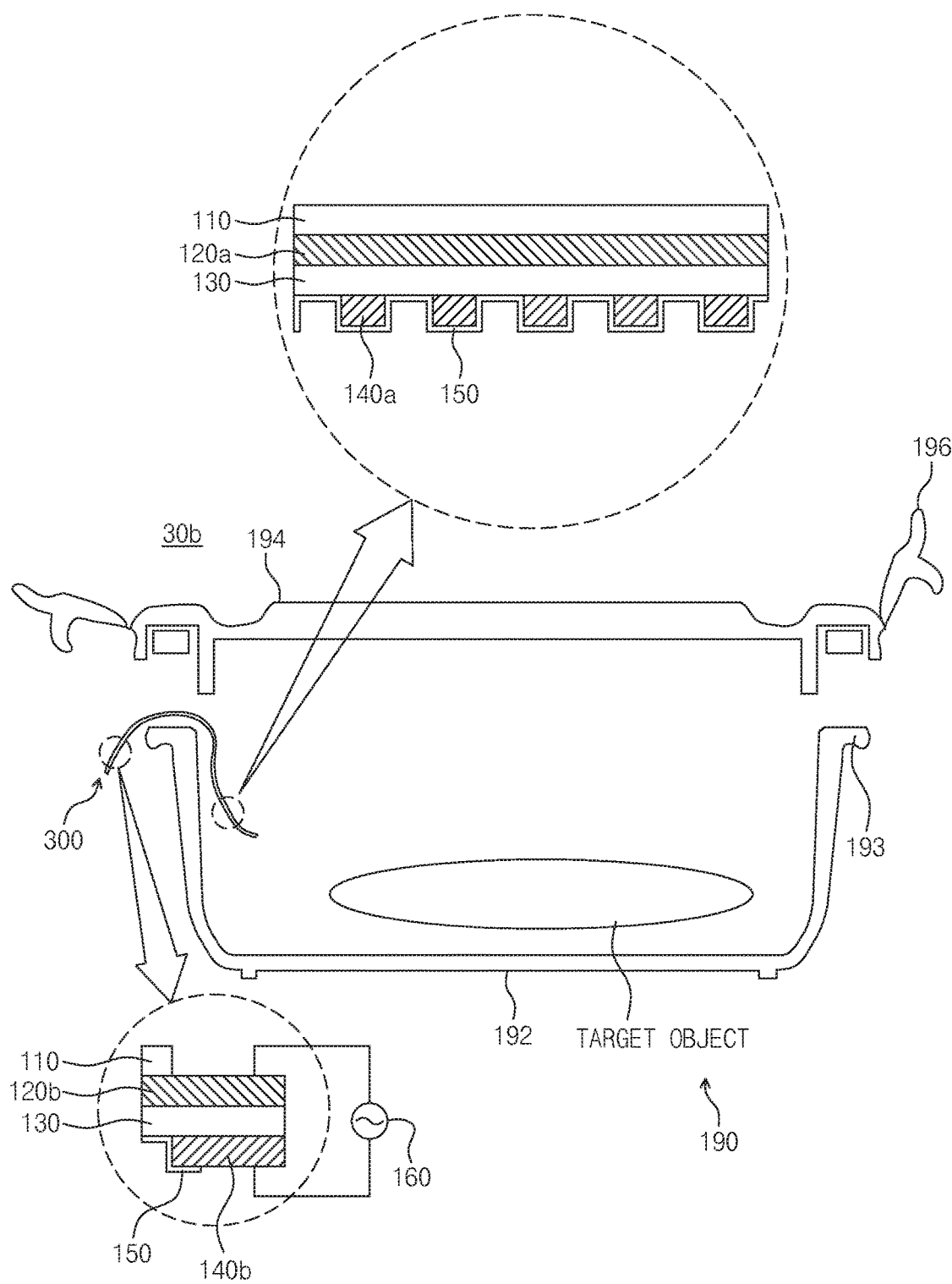
FIG. 17 is a diagram illustrating a storage container, in which a sterilization film according to some embodiments is provided.

FIG. 17 is a diagram illustrating a storage container, in which a sterilization film according to some embodiments is provided.

Referring to FIG. 17, a storage container 30*b* may include a main storage container 190, which is used to contain a target object. The storage container 30*b* may include a sterilization film 300, in addition to the main storage container 190. Here, the main storage container 190 may include a body portion 192 and a lid portion 194 and may be used to contain the target object, and the sterilization film 300 may include a sterilization region, which is provided in a storage space and is used to generate plasma, and a pad region exposed to the outside The sterilization region of the sterilization film 300 may include an upper electrode 120*a* shaped like a plate, an upper protection layer 110 provided on the upper electrode 120*a*, a lower electrode 140*a* provided under the upper electrode 120*a* and in a porous screen structure, a lower protection layer 150 provided under the lower electrode 140*a*, and a dielectric barrier film 130 provided between the upper and lower electrodes 120*a* and 140*a*.

The pad region may include a lower pad 140*b*, the dielectric discharge film 130, and an upper pad 120*b*, which are sequentially stacked.

The sterilization film 300 may be sandwiched between and fastened to the body and lid portions 192 and 194 of the main storage container 190. In the case where the lid portion 194 is separated from the main storage container 190, the sterilization film 300 may be also be separated from the main storage container 190.

Hereinafter, a sterilization method according to some embodiments will be described.

A sterilization film 100 may include a lower protection layer 150, a lower electrode 140*a*, a dielectric barrier film 130, an upper electrode 120*a*, and an upper protection layer 110 which are sequentially stacked. The sterilization film 100 may include a sterilization region and a pad region. A hermetically-wrapping container may include the sterilization film.

A method of sterilizing the hermetically-wrapping container may include disposing a wrapping target into the hermetically-wrapping container through an entrance of the hermetically-wrapping container; sealing the entrance of the hermetically-wrapping container; and applying an AC voltage to upper and lower pads, which are exposed to the outside of the hermetically-wrapping container and are respectively connected to the upper and lower electrodes, to generate plasma in the hermetically-wrapping container and to sterilize the wrapping target.

The sterilization method may further include heating the hermetically-wrapping container to a temperature ranging from 80° C. to 120° C. to thermally sterilize the wrapping target.

The sterilization method may further include preliminarily sterilizing the wrapping target before the disposing of the wrapping target into the hermetically-wrapping container. Here, the step of preliminarily sterilizing the wrapping target may include applying an AC voltage to the upper and lower pads, which are respectively connected to the upper and lower electrodes, to generate plasma in the hermetically-wrapping container.

The sealing of the entrance of the hermetically-wrapping container may include filling the hermetically-wrapping container with an oxygen-containing gas and sealing the entrance of the hermetically-wrapping container filled with the oxygen-containing gas.

According to some embodiments, a wrapping structure may be used for processed food or food products with long expiration date. In this case, the wrapping structure may be used to sterilize microorganisms, which may proliferate during its distribution process, without damage of the wrapping structure. Furthermore, since the sterilization process can be performed on the wrapping structure itself, it is possible to achieve various technical effects (e.g., improvement of food safety, extension of shelf life, reduction in cost for food sterilization and distribution). In addition, if a simple power supply is provided, the use of the wrapping structure may allow any of factory operators (e.g., immediately after a wrapping process), retailers, and consumers to perform a sterilization process using atmospheric pressure plasma, before opening the wrapping structure. Accordingly, the wrapping structure may be used to provide reliable fool products.

According to some embodiments, a sterilization film may be configured to have an electrode structure formed of two or more materials. Thus, it is possible to achieve various technical advantages (e.g., high thermal stability, long lifetime, improved efficiency, and low cost), compared with a conventional electrode structure (e.g., an industrial hollow electrode) formed of a single material.

While some embodiments have been particularly shown and described, it will be understood by one of ordinary skill in the art that variations in form and detail may be made therein without departing from the spirit and scope of the attached claims.

The invention claimed is:

1. A sterilization film configured to generate atmospheric pressure plasma, comprising:
    a dielectric barrier film having a flexible property;
    an upper electrode layer provided on a top surface of the dielectric barrier film, the upper electrode layer comprising an upper electrode, which is provided in a thin-plate shape, and an upper pad, which is electrically connected to the upper electrode and is used to provide an electrical connection path to an outside;
    a lower electrode layer provided on a bottom surface of the dielectric barrier film, the lower electrode layer comprising a lower electrode, which is provided in a porous screen structure including a plurality of through holes, and a lower pad, which is used to provide an electrical connection path to the lower electrode; and
    a lower protection layer provided to enclose an exposed surface of the lower electrode layer and formed of a dielectric material,
    wherein the upper pad and the lower pad are electrically connected to an external power and are used to generate plasma near the porous screen structure.

2. The sterilization film of claim 1, wherein the lower protection layer is provided to cover only bottom and side surfaces of the through holes of the porous screen structure.

3. The sterilization film of claim 1, wherein the dielectric barrier film comprises at least one of polytetrafluoroethylene (PTFE), polyethylene, polypropylene, polystyrene, or polyester.

4. The sterilization film of claim 1, wherein the upper electrode layer and the lower electrode layer comprise copper or aluminum.

5. The sterilization film of claim 1, wherein the through holes of the porous screen structure has a diameter ranging from 0.3 mm to 3 mm.

6. The sterilization film of claim 1, wherein the porous screen structure comprises at least one letter-shaped portion.

7. The sterilization film of claim 1, wherein the upper pad and the lower pad are spaced apart from each other such that the upper and lower pads are prevented from facing each other.

8. The sterilization film of claim 1, further comprising an abrasion-resistance layer interposed between the upper electrode layer and the upper protection layer.

9. The sterilization film of claim 8, further comprising an upper protection layer provided on the upper electrode layer.

10. The sterilization film of claim 9, wherein the upper protection layer comprises polyether, and
    the lower protection layer comprises polypropylene.

11. The sterilization film of claim 1, further comprising a first coupling element, which is provided near the porous screen structure and is coupled to a second coupling element provided near an opening of a sealing container to seal the sealing container.

12. The sterilization film of claim 11, wherein the first coupling element is a part of a zipper lock.

13. A hermetically-wrapping container comprising a sterilization film,
    wherein the sterilization film comprises:
    a sterilization region configured to generate plasma in the hermetically-wrapping container by using an upper electrode, a lower electrode provided in a porous screen structure, and a dielectric barrier film disposed between the upper and lower electrodes;
    a sealing region provided around the sterilization region, the sealing region being used to contain a target object; and
    a pad region comprising upper and lower pads electrically and respectively connected to the upper and lower electrodes.

14. The hermetically-wrapping container of claim 13, wherein the upper and lower pads are provided such that the upper and lower pads are prevented from facing each other.

15. The hermetically-wrapping container of claim 13, wherein the sealing region of the sterilization film comprises:
    a dielectric barrier film having a flexible property;
    the upper electrode provided on a top surface of the dielectric barrier film and in a thin-plate shape;
    an upper protection layer provided on a top surface of the upper electrode; and
    a lower protection layer provided on a bottom surface of the lower electrode.

16. The hermetically-wrapping container of claim 13, wherein the dielectric barrier film comprises at least one of polytetrafluoroethylene (PTFE), polyethylene, polypropylene, polystyrene, or polyester.

17. The hermetically-wrapping container of claim 13, wherein the upper electrode and the lower electrode comprises copper or aluminum.

18. The hermetically-wrapping container of claim 13, wherein the sterilization region of the sterilization film comprises:
    a dielectric barrier film having a flexible property;
    the upper electrode provided on a top surface of the dielectric barrier film and in a thin-plate shape;
    the lower electrode provided on a bottom surface of the dielectric barrier film and in the porous screen structure with a plurality of through holes;
    an upper protection layer provided on a top surface of the upper electrode; and a lower protection layer provided on a bottom surface of the lower electrode.

19. The hermetically-wrapping container of claim 18, wherein the upper protection layer comprises polyether, and the lower protection layer comprises polypropylene.

* * * * *

UNITED STATES PATENT AND TRADEMARK OFFICE
CERTIFICATE OF CORRECTION

PATENT NO. : 9,737,091 B2  
APPLICATION NO. : 15/434952  
DATED : August 22, 2017  
INVENTOR(S) : Youbong Lim Page 1 of 1

It is certified that error appears in the above-identified patent and that said Letters Patent is hereby corrected as shown below:

In the Claims

On Line 7 of Column 24, Claim 8 should be re-numbered as Claim 9, and it should read "The sterilization film of claim 8, further comprising...".

On Line 10 of Column 24, Claim 9 should be re-numbered as Claim 8, and it should read "The sterilization film of claim 1, further comprising...".

On Line 12 of Column 24, Claim 10 should read "The sterilization film of claim 8, wherein...".

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*